(12) United States Patent
Konishi et al.

(10) Patent No.: US 8,406,362 B2
(45) Date of Patent: Mar. 26, 2013

(54) COMMUNICATION DEVICE

(75) Inventors: Shinya Konishi, Kanagawa (JP); Norio Arai, Kanagawa (JP); Osamu Ohnishi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 484 days.

(21) Appl. No.: 12/801,366

(22) Filed: Jun. 4, 2010

(65) Prior Publication Data

US 2011/0007857 A1 Jan. 13, 2011

(30) Foreign Application Priority Data

Jul. 10, 2009 (JP) ................................. 2009-163623

(51) Int. Cl.
*H04L 7/02* (2006.01)

(52) U.S. Cl. ........ 375/360; 375/265; 375/354; 375/365; 375/373; 370/503; 327/141

(58) Field of Classification Search .................. 375/265, 375/354, 360, 365, 373; 370/503; 327/141
See application file for complete search history.

(56) References Cited

U.S. PATENT DOCUMENTS

| | | | | |
|---|---|---|---|---|
| 6,278,755 | B1 * | 8/2001 | Baba et al. | 375/360 |
| 7,474,716 | B2 * | 1/2009 | Vallet et al. | 375/340 |
| 7,620,072 | B2 * | 11/2009 | Kihara | 370/480 |
| 2004/0202266 | A1 * | 10/2004 | Gregorius et al. | 375/355 |
| 2009/0034671 | A1 * | 2/2009 | Konishi | 375/355 |
| 2009/0279654 | A1 * | 11/2009 | Konishi et al. | 375/362 |

FOREIGN PATENT DOCUMENTS

JP 7-321646 A 12/1995

* cited by examiner

*Primary Examiner* — Kenneth Lam
*Assistant Examiner* — Sung Ahn
(74) *Attorney, Agent, or Firm* — McGinn IP Law Group, PLLC

(57) ABSTRACT

A communication device includes a current information storage unit 130 that stores the bit boundary signal at each of timings at which a sampling clock is updated, a past information storage unit 140 that takes in and stores a signal stored in the current information storage unit 130 when a variation point of a reception signal is detected, and does not update a signal stored therein when no variation point of the reception signal is detected, and a clock selection unit 44 that selects CLKSEL2 used for the sampling of the reception signal from N-phase clocks based on a signal stored in the current information storage unit 130 when a variation point of the reception signal is detected, and selects CLKSEL3 based on a signal stored in the past information storage unit 140 when no variation point of the reception signal is detected.

8 Claims, 14 Drawing Sheets

COMMUNICATION DEVICE

INCORPORATION BY REFERENCE

This application is based upon and claims the benefit of priority from Japanese patent application No. 2009-163623, filed on Jul. 10, 2009, the disclosure of which is incorporated herein in its entirety by reference.

BACKGROUND

1. Field of the Invention

The present invention relates to a communication device that detects synchronization by using N-phase clocks (N is an integer equal to or greater than two), in particular a communication device that dynamically update a sampling clock of a reception signal.

2. Description of Related Art

An LSI circuit for wireless communication is composed of an LSI circuit for a high frequency (RF) and an LSI circuit for a baseband (BB). The LSI circuit for a high frequency performs analog processing on a signal received through an antenna. The LSI circuit for a baseband performs digital processing on a signal that is not modulated yet or is already demodulated. In high-speed synchronous communication between the LSI circuit for a high frequency and the LSI circuit for a baseband, signal delays and/or jitter occur in the transmission line. The jitter component includes a jitter component occurring in a transmission signal and a jitter component of a clock used on the receiving side. In such a situation, there has been a problem that if these LSI circuits operate independently based on their respective clock signals that are asynchronous to each other, data cannot be correctly received on the LSI circuit on the receiving side. Therefore, to implement correct data reception, the phase of the clock used in data reception on the receiving-side LSI circuit is often controlled.

As a method of controlling the phase of a clock used for data reception in the receiving-side LSI, a technique in which a reception signal having a frame structure is synchronously detected by using N-phase clocks (N is an integer equal to or greater than two) and the optimal phase of the sampling clock is thereby selected based on the synchronous detection result has been under development. A receiving device relating to the present invention is briefly explained hereinafter with reference to FIG. 11.

FIG. 11 is a block diagram showing a configuration of a receiving device relating to the present invention. The receiving device shown in FIG. 11 samples a reception signal by using a frequency n-times as high as the symbol transmission rate. Note that the reception signal has been structured as a frame(s), and the frame includes a synchronous word (Sync Word) area used for synchronization establishment and a payload (Payload) area used to store IQ data as shown in FIGS. 15A and 15B (which are explained later). Synchronous word data that is set in advance by the system is stored in the synchronous word area. In the system, the payload data is transmitted subsequent to the synchronous word data.

An RF unit 202 demodulates a radio signal received through an antenna 201 to generate a data signal, and transmits the generated data signal to a DBD unit 203. A synchronous detection unit 230 samples synchronous word data included in the reception signal by using N-phase clocks (FCLK_P[n−1:0]), and compares the sampling result with a predetermined synchronous pattern. The synchronous detection unit 230 outputs an identification signal (OKFLG) of a clock(s) with which an identical pattern to the predetermined synchronous pattern can be sampled to a clock phase selection unit 240. The clock phase selection unit 240 selects one of these identified clocks as a sampling clock, and outputs its selection signal (CLKSEL[n−1:0]) to an FIFO unit 280. A clock transfer processing 270 receives a data signal output from the synchronous detection unit 230 using the N-phase clock, and transfers the received data signal to a reference clock (FCLK_M). The FIFO unit 280 receives payload data subsequent to the synchronous word data by using the selected sampling clock. A PLL (Phase Locked Loop) circuit 250 generates a plurality of clocks (FCLK_P[n−1:0]) each of which has a different phase from that of the reference clock (FCLK_M). A signal processing circuit 290 processes the signal that is received in this manner.

Further, as a technique relating to the present invention, Japanese Unexamined Patent Application Publication No. 7-321646, for example, discloses a phase decision circuit that selects a suitable sampling clock from N-phase clocks according to a variation point of a reception signal on which the decision is to be made. The phase decision circuit in accordance with Japanese Unexamined Patent Application Publication No. 7-321646 is briefly explained hereinafter with reference to FIGS. 12 and 13.

FIG. 12 is a circuit diagram showing a configuration of a phase decision circuit in accordance with Japanese Unexamined Patent Application Publication No. 7-321646. As shown in FIG. 12, the phase decision circuit includes a sampling unit 301 that detects a bit boundary, which is a variation point of a reception signal, a decision protection unit 302 that retains information about the detected bit boundary, a phase decision unit 303, a clock selection unit 304, and a synchronization protection unit 305.

The sampling unit 301 operates by using a clock four times as fast as the sampling rate, for example, and uses four-phase clocks C0, C1, C2 and C3. The sampling unit 301 receives a reception signal by using these four-phase clocks in an input sampling circuit 311 (D-type flip-flops 411 to 414). Then, four received data A, B, C and D are compared in an arithmetic circuit 312 (EORs 421 to 424), and a calculation result indicating a variation point of the reception signal is retained in a phase adjustment circuit 313 (D-type flip-flops 431 to 434). Note that the output signal of the arithmetic circuit 312 is readjusted in timing in the phase adjustment circuit 313, and transmitted as flag signals E, F, G and H indicating the variation point of the reception signal to the decision protection unit 302.

The decision protection unit 302 includes JK-type flip-flops 511 to 514 corresponding to respective four-phase clocks, and protects variation point information of the reception signal until a count value counted in a count unit 515 reaches a predefined number. The decision protection unit 302 is reset to the initial value when the count value reaches the predefined number in the count unit 515, and obtains variation point information of the reception signal from the sampling unit 301 again.

The phase decision unit 303 distinguishes the phase state of each clock based on the protected variation-point information of the reception signal, and determines which clock signal is most suitable. The clock selection unit 304 selects the optimal sampling phase from the four-phase clocks according to the phase decision result in the phase decision unit 303.

The synchronization protection unit 305 detects out-of-synchronization when the variation point of the reception signal moves and the relation between the reception signal and the determined phase is not thereby optimal. In this way, even when the reception signal is unstable, the sampling phase is selected so that the sampling phase dynamically follows the variation point of the reception signal.

FIG. 13 is operation waveforms of the phase decision circuit in accordance with Japanese Unexamined Patent Application Publication No. 7-321646. In the example shown in FIG. 13, the input sampling circuit 311 outputs signals shown as FIGS. 13(a) to 13(i) by sampling a reception signal by using the clock signals C0 to C3. The arithmetic circuit 312 outputs signals shown as FIGS. 13(g) to 13(j) by calculating the exclusive-OR of these output signals. The phase adjustment circuit 313 outputs signals shown as FIGS. 13(k) and 13(l) by sampling the signals shown as FIGS. 13(g) to 13(j) again by using the clock capable of catching "1" level of the waveform with certainty. In the example shown in FIG. 13, the phase decision unit 303 can determine that the variation point of the reception signal is located between C0 and C1, and therefore the clock C3, for example, is determined to be the optimal phase.

SUMMARY

However, in the receiving device shown in FIG. 11, there is a problem that when the reception signal becomes unstable, the variation point of the reception signal cannot be dynamically tracked and the optimal sampling clock thereby cannot be selected. This problem is explained hereinafter in a more concrete manner with reference to FIGS. 14, 15A, and 15B. Note that in FIGS. 14, 15A, and 15B, an example in which one bit of a reception signal is sampled by using a cycle eight times as fast as the symbol transmission rate (eight phases) is explained.

FIG. 14 shows an eye pattern of the entire frame (RX frame) of a reception signal. The clock phase selection unit 240 shown in FIG. 11 determines that the clock capable of receiving synchronous word data with stability is a clock capable of receiving a payload data with stability. The reception signal contains noise and/or jitter (fluctuations of cycle) resulting from the accuracy of the PLL circuit. Because of the occurrence of jitter, sampling cannot be performed with stability at variation points of the reception signal. Therefore, in the example shown in FIG. 14, the clock phase selection unit 240 determines that the phase indicated as "#4" (i.e., clock FCLK_P4) is the clock capable of sampling the reception signal with a more stable manner than any other clocks among the clocks distinguished by the synchronous detection unit 230 (FCLK_P2 to FCLK_P5 indicated inside the dashed-line portion).

As shown in FIG. 15A, the communication device shown in FIG. 11 selects the clock FCLK_P4 as a sampling clock, and then subsequently samples payload data by using the clock FCLK_P4. That is, the communication device performs sampling of the reception signal by using the determined sampling clock (FCLK_P4) (fixed). In the communication device shown in FIG. 11, since the sampling clock, which is determined to be optimal in the synchronous detection processing, is not changed until the reception of the payload data has been completed, the communication device receives all the data Data #0 to #4 constituting the payload data by using the fixed sampling clock.

Note that when the opening ratio of the eye pattern is maintained throughout the entire frame of the reception signal as shown in FIG. 14, it does not cause any problem. However, there is a concern that the opening ratio of the eye pattern will deteriorate in the future as the bit rate will become faster and the frame of a payload will become longer. In a situation where the opening ratio of the eye pattern is not maintained, when a phase, which is determined to be optimal in the synchronous detection processing, is continuously used for the reception of payload data, there is a risk that the selected phase might straddle a jitter boundary and thus leading to erroneous reception of the reception signal. Therefore, as shown in FIG. 15B, it is necessary to dynamically update the sampling clock at predetermined timing even during the reception of payload data so that the reception can be performed with the optimal sampling clock at all times. Note that in the example shown in the figures, after the sampling clock (FCLK_P4) is determined, the reception signal is received in predetermined units by using the updated sampling clock.

Further, in accordance with the phase decision circuit disclosed in Japanese Unexamined Patent Application Publication No. 7-321646, it is possible to dynamically update the sampling phase so as to follow the variation point of the reception signal. However, there is a problem that when a part of the reception signal includes a series of data in which no variation point exists, the optimal sampling clock cannot be selected. This problem is explained hereinafter in a more concrete manner.

For example, in a case where the serial data series of a reception signal supplied to the phase adjustment circuit 311 is continuous data in which a certain signal level continues (e.g., data series in which "0" or "1" continues, expressed "0xFFFF" or "0x0000" in the hexadecimal number system), the phase adjustment circuit 313 continuously outputs Low-level signals from all the D-type flip-flops 431 to 434 as long as continuous data like this is supplied. As a result, since the phase decision unit 303 cannot obtain a variation point of the reception signal, the suitable clock signal cannot be determined. Therefore, the selection of a clock by the clock selection unit 304 is not initiated.

Further, even in the case where the optimal clock was selected once based on a reception signal containing non-continuous data, when the counter unit 515 resets the JK-type flip-flops 511 to 514 to the initial values after the clock selection and continuous data continues in the subsequent reception signal, the suitable clock signal cannot be determined again by using the phase decision unit 303. Therefore, the selection of a clock by the clock selection unit 304 is not initiated.

Note that in the phase decision circuit disclosed in Japanese Unexamined Patent Application Publication No. 7-321646, it is conceivable that the frame of target reception signals is a frame in which a variation point of a High level or Low level appears without fail in the serial data series (such as a frame used in a high-speed serial transfer scheme typified by 8B10B) or a transfer frame composed of a preamble used for synchronization establishment and a not-so-long data series or the like. However, in the case where a reception signal should be divided into a plurality of data sections and an optimal clock should be selected for each of those data sections, the above-described continuous data may be included in a short data section composed of several bits (e.g., composed of four bits). In such a situation, there is a possibility that a variation point cannot be detected for a reception signal having a frame structure like that.

That is, in the technique relating the present invention disclosed in FIG. 11 and in Japanese Unexamined Patent Application Publication No. 7-321646, for a reception signal having a frame structure including synchronous word data used to detect synchronization and payload data subsequent to the synchronous word data, a variation point of the reception signal cannot be dynamically tracked when continuous data is included in the reception signal, and therefore the selection of the optimal sampling clock cannot be made.

A first exemplary aspect of the present invention is a communication device that receives a reception signal including a synchronous word and a payload in each frame and samples the reception signal by using one sampling clock selected from N-phase clocks (N is an integer equal to or greater than two), including: a bit boundary detection unit that detects a bit boundary signal from the received reception signal, the bit boundary signal indicating between which clocks a variation point of the reception signal is located among the N-phase clocks; an update timing control unit that controls timings at which the sampling clock is updated; a first bit boundary signal storage unit that stores the bit boundary signal at each of the timings; a second bit boundary signal storage unit that takes in and stores a signal stored in the first bit boundary signal storage unit when a variation point of the reception signal is detected in the bit boundary detection unit, and does not update a signal stored therein when no variation point of the reception signal is detected; and a first clock selection unit that selects the sampling clock based on a signal stored in the first bit boundary signal storage unit when a variation point of the reception signal is detected in the bit boundary detection unit, and selects the sampling clock based on a signal stored in the second bit boundary signal storage unit when no variation point of the reception signal is detected.

In this way, the first bit boundary signal storage unit stores a bit boundary signal at each of the update timings of the sampling clock. Further, the second bit boundary signal storage unit takes in and stores a signal stored in the first bit boundary signal storage unit when a variation point of the reception signal is detected, and does not update a signal stored therein when no variation point of the reception signal is detected. Then, the first clock selection unit selects a sampling clock based on a signal stored in the first bit boundary signal storage unit when a variation point of the reception signal is detected, and selects a sampling clock based on a signal stored in the second bit boundary signal storage unit when no variation point of the reception signal is detected. In this way, even when no variation point of data is detected, a sampling clock can be selected based on a signal stored in the second bit boundary signal storage unit. Therefore, even when continuous data is included in a reception signal, a variation point of the reception signal can be dynamically tracked and the optimal sampling clock thereby can be selected.

According to a communication device in accordance with an exemplary aspect of the present invention, it is possible to provide a communication device capable of dynamically following a variation point of a reception signal even when continuous data is included in the reception signal and thereby selecting the optimal sampling clock.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

An exemplary best mode for carrying out the present invention is explained hereinafter in detail with reference to the drawings. For clarifying the explanation, the following description and the drawings are simplified or partially omitted as appropriate. Components and equivalent portions having the same structure or function are denoted with the same signs throughout the drawings.

First Exemplary Embodiment

Firstly, a configuration of a communication device (specifically, receiving device) in accordance with this exemplary embodiment of the present invention is explained with reference to FIG. 1. A reception signal in this exemplary embodiment includes, in its data series, a synchronous word (Sync Word) area and a payload (Payload) area. A frame of the reception signal has such a configuration that the payload area is disposed subsequent to the synchronous word area. Synchronous word data that is set in advance by the system is stored in the synchronous word area. Processing data to be processed in the system is stored in the payload area. In the system, payload data is transmitted subsequent to the synchronous word data.

In this exemplary embodiment, a reception signal including a synchronous word and a payload in each frame is received, and the reception signal is sampled by using a frequency eight times as high as the symbol rate. That is, a reception signal is sampled by using a sampling clock having eight phases per symbol (hereinafter, these phases may be referred to by numbers #0 to #7). Therefore, with regard to N-phase clocks (N is an integer equal to or greater than two) used for the sampling of a reception signal, an example where N is eight is explained hereinafter.

Figure 1:
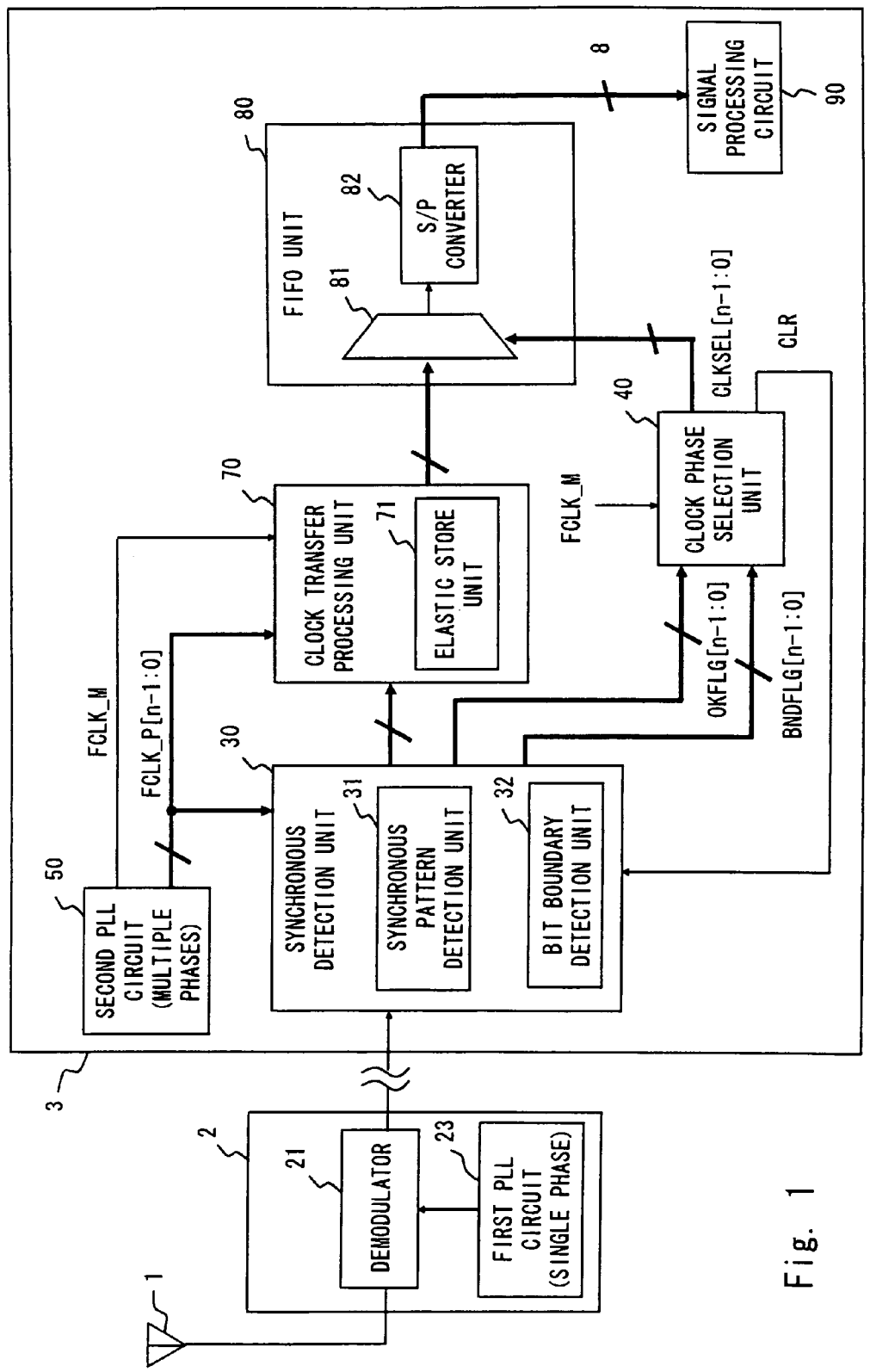
FIG. 1 is a block diagram illustrating a receiving device in accordance with a first exemplary embodiment of the present invention.

As shown in FIG. 1, a receiving device includes an antenna 1, a high-frequency (RF) unit 2, and a digital baseband (DBB) unit 3.

The RF unit 2 includes a demodulator 21 and a first PLL (Phase Locked Loop) circuit 23. The demodulator 21 demodulates a radio signal received through the antenna 1 to generate a data signal. This data signal is, for example, parallel data having a bit width of 8 bits. For example, the demodulator 21 converts parallel data into serial data, and outputs the converted serial data as a reception signal. The reception signal constitutes, for example, a data series having a bit width of 1 bit.

The first PLL circuit 23 outputs, for example, a single-phase clock subsequent to synchronous word data. This clock is used for operation processing of a data series in the demodulator 21.

The DBB unit 3 includes a synchronous detection unit 30, a clock phase selection unit 40, a second PLL circuit 50, a clock transfer processing unit 70, an FIFO unit 80, and a signal processing circuit 90. Note that the detailed configurations of a synchronous pattern detection unit 31 of the synchronous detection unit 30 and an elastic store unit 71 of the clock transfer processing unit 70, the detailed configuration of a bit boundary detection unit 32, and the detailed configuration of the clock phase selection unit 40 are explained later.

The synchronous detection unit 30 includes a synchronous pattern detection unit 31 and a bit boundary detection unit 32. The synchronous pattern detection unit 31 performs synchronous detection processing by receiving synchronous word data included in the received reception signal by using n clocks FCLK_P[n−1:0] having mutually different phases (hereinafter, they may be simply referred to as FCLK_P[n−1:0]). Then, the synchronous pattern detection unit 31 generates an identification signal OKFLG[n−1:0] used to identify the synchronously-detected clock(s) (hereinafter, it may be simply referred to as OKFLG[n−1:0]). OKFLG[n−1:0] is a parallel signal indicating an output from the synchronous pattern detection unit 31. OKFLG[n−1:0] is transmitted in parallel by using n signal lines. Note that FCLK_P[n−1:0] is N-phase clocks (N is an integer equal to or greater than two) generated by the second PLL circuit 50 (which is explained later).

The synchronous pattern detection unit 31 samples synchronous word data included in the received reception signal by using FCLK_P[n−1:0]. Next, the synchronous pattern detection unit 31 compares a sampling result with a predetermined synchronous pattern and thereby distinguishes the clock with which the predetermined synchronous pattern can be correctly sampled from FCLK_P[n−1:0]. Then, the synchronous pattern detection unit 31 outputs OKFLG[n−1:0], i.e., a signal indicating which clock is the clock capable of correctly sampling the predetermined synchronous pattern to the clock phase selection unit 40.

Figure 2:
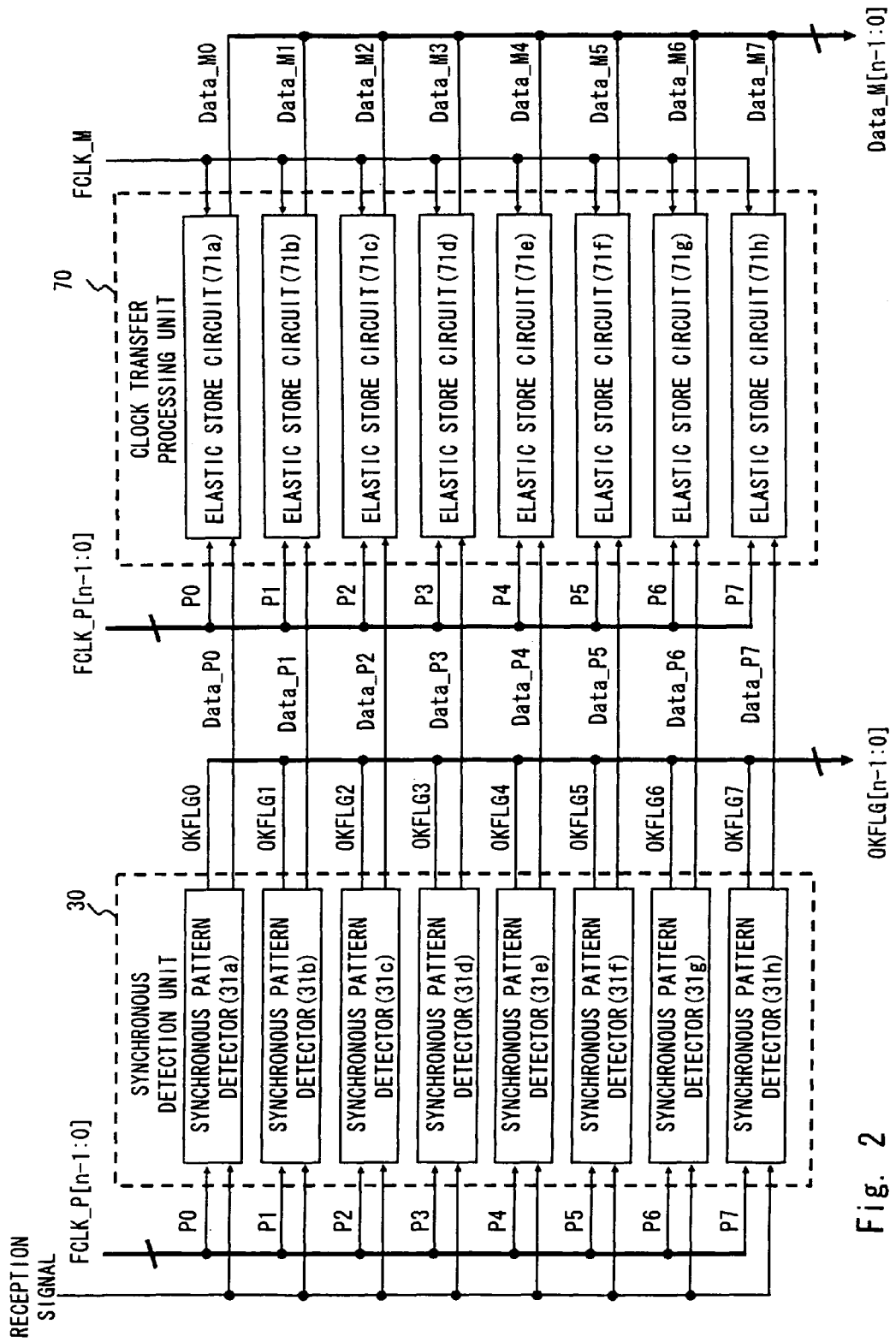
FIG. 2 is a block diagram illustrating a synchronous detection unit and a clock transfer processing unit in accordance with a first exemplary embodiment of the present invention.

More detailed configurations of the synchronous detection unit 30 and the clock transfer processing unit 70 are explained hereinafter with reference to FIG. 2. FIG. 2 is an example of a block diagram illustrating configurations of the synchronous pattern detection unit 31 of the synchronous detection unit 30 and the elastic store unit 71 of the clock transfer processing unit 70 (which is explained later). As shown in FIG. 2, the synchronous pattern detection unit 31 is constructed by using a plurality of synchronous pattern detectors 31a to 31h in the synchronous detection unit 30. In this exemplary embodiment, the synchronous pattern detectors 31a to 31h perform character synchronization by using synchronous word data. Note that an example where the number of phases of FCLK_P[n−1:0] is eight is shown in FIG. 2, and the following explanation is made on the assumption that the synchronous pattern detectors 31a to 31h operate with eight clocks FCLK_P0 to FCLK_P7 having mutually different phases.

The synchronous pattern detectors 31a to 31h, which have received a reception signal, samples synchronous word data included in the reception signal with FCLK_P0 to FCLK_P7. Specifically, it samples the synchronous word data of the reception signal at a rising edge (or falling edge) of the clock. Next, the synchronous pattern detectors 31a to 31h compare a synchronous pattern (e.g., a predetermined synchronous pattern stored in advance in storage means such as a register of the DBB unit 3) with a sampling result of the synchronous word data included in the reception signal, and thereby distinguishes the clock with which synchronous word data matching with the synchronous pattern can be sampled from FCLK_P0 to FCLK_P7. Each of the synchronous pattern detectors 31a to 31h outputs an OKFLG signal indicating "1", for example, when the synchronous pattern was able to be correctly sampled with the supplied clock, whereas it outputs an OKFLG signal indicating "0", for example, when the synchronous pattern was not able to be correctly sampled with the supplied clock.

To explain in a more concrete manner, the synchronous pattern detector 31a, for example, samples synchronous word data included in a reception signal by using FCLK_P0. Therefore, the synchronous pattern detector 31a compares a result obtained by sampling the synchronous word by using FCLK_P0 with the synchronous pattern stored in the storage means. Then, when the sampling result matches with the synchronous pattern, the synchronous pattern detector 31a determines that FCLK_P0 is a clock with which the synchronous pattern can be correctly sampled and outputs an OKFLG0 signal indicating "1". The other synchronous pattern detectors 31b to 31h operate in a similar manner, and output respective signals OKFLG1 to OKFLG7.

Therefore, OKFLG[n−1:0] shown in FIG. 2 is a parallel signal having a plurality of bits in which each of the bits corresponding clocks with which the synchronous pattern was able to be correctly sampled becomes "1" and each of the bits corresponding clocks with which the synchronous pattern was not able to be correctly sampled becomes "0". The synchronous detection unit 30 outputs OKFLG[n−1:0] to the clock phase selection unit 40. Examples of the parallel signal OKFLG[n−1:0] supplied from the synchronous pattern detectors 31a to 31h include a signal expressed as "(OKFLG7, OKFLG6, OKFLG5, ... OKFLG0)=(0, 1, 1, 1, 1, 1, 0, 0)". The first bit from the left in the bit series is the MSB (Most Significant Bit), and the first bit from the right is the LSB (Least Significant Bit). In this example, the signal indicates that the synchronous word data was able to be correctly detected with the clocks corresponding to the third to seventh bits from the LSB, i.e., FCLK_P2 to FCLK_P6.

The bit boundary detection unit 32 performs bit boundary detection processing by receiving a reception signal by using FCLK_P[n−1:0]. The bit boundary detection unit 32 generates a bit boundary signal BNDFLG[n−1:0] (hereinafter, it may be simply referred to as BNDFLG[n−1:0]) from the reception signal. The bit boundary signal BNDFLG[n−1:0] indicates between which clocks a variation point of the reception signal is located among FCLK_P[n−1:0]. BNDFLG[n−1:0] is a parallel signal indicating an output from the bit boundary detection unit 32. The bit boundary detection unit 32 is transmitted in parallel by using n signal lines. The bit boundary detection unit 32 is explained hereinafter in a more detailed manner with reference to FIGS. 3 to 5.

Figure 3:
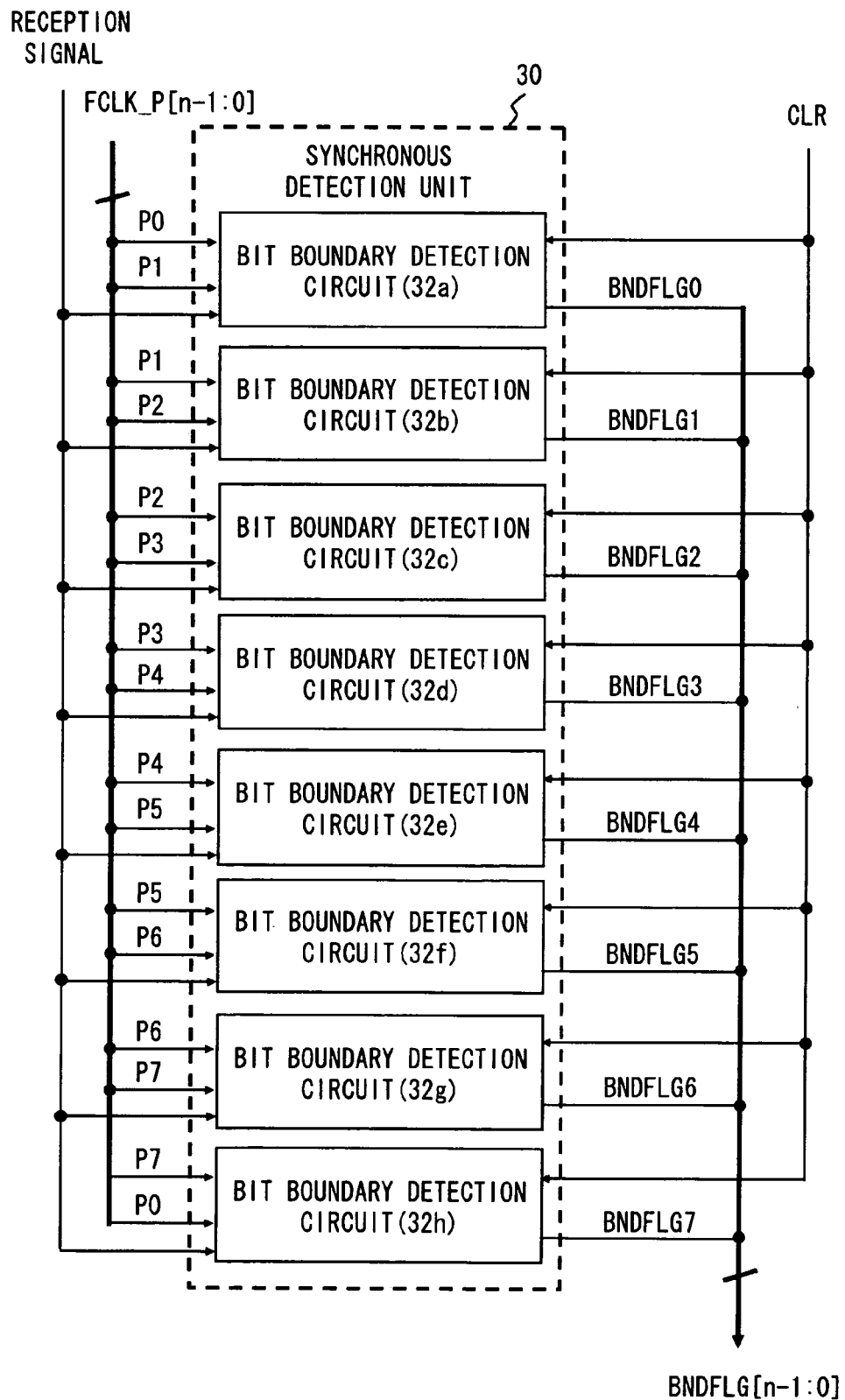
FIG. 3 is a block diagram illustrating a synchronous detection unit in accordance with a first exemplary embodiment of the present invention.

FIG. 3 is an example of a block diagram illustrating a configuration of the bit boundary detection unit 32. As shown in FIG. 3, the bit boundary detection unit 32 is constructed by using a plurality of bit boundary detection circuits 32a to 32h in the synchronous detection unit 30. In this exemplary embodiment, the bit boundary detection circuits 32a to 32h detect a bit boundary signal by comparing a reception signal that is received by using a clock having a first phase included in FCLK_P[n−1:0] with a reception signal that is received by using a clock having a second phase adjacent to the first phase. Further, the bit boundary detection circuits 32a to 32h clear the value of the detected bit boundary signal by using a CLR signal (which is explained later). Note that an example where the number of phases of FCLK_P[n−1:0] is eight is shown in FIG. 3, and the following explanation is made on the assumption that the bit boundary detection circuits 32a to 32h operate with eight clocks FCLK_P0 to FCLK_P7 having mutually different phases.

Figure 4:
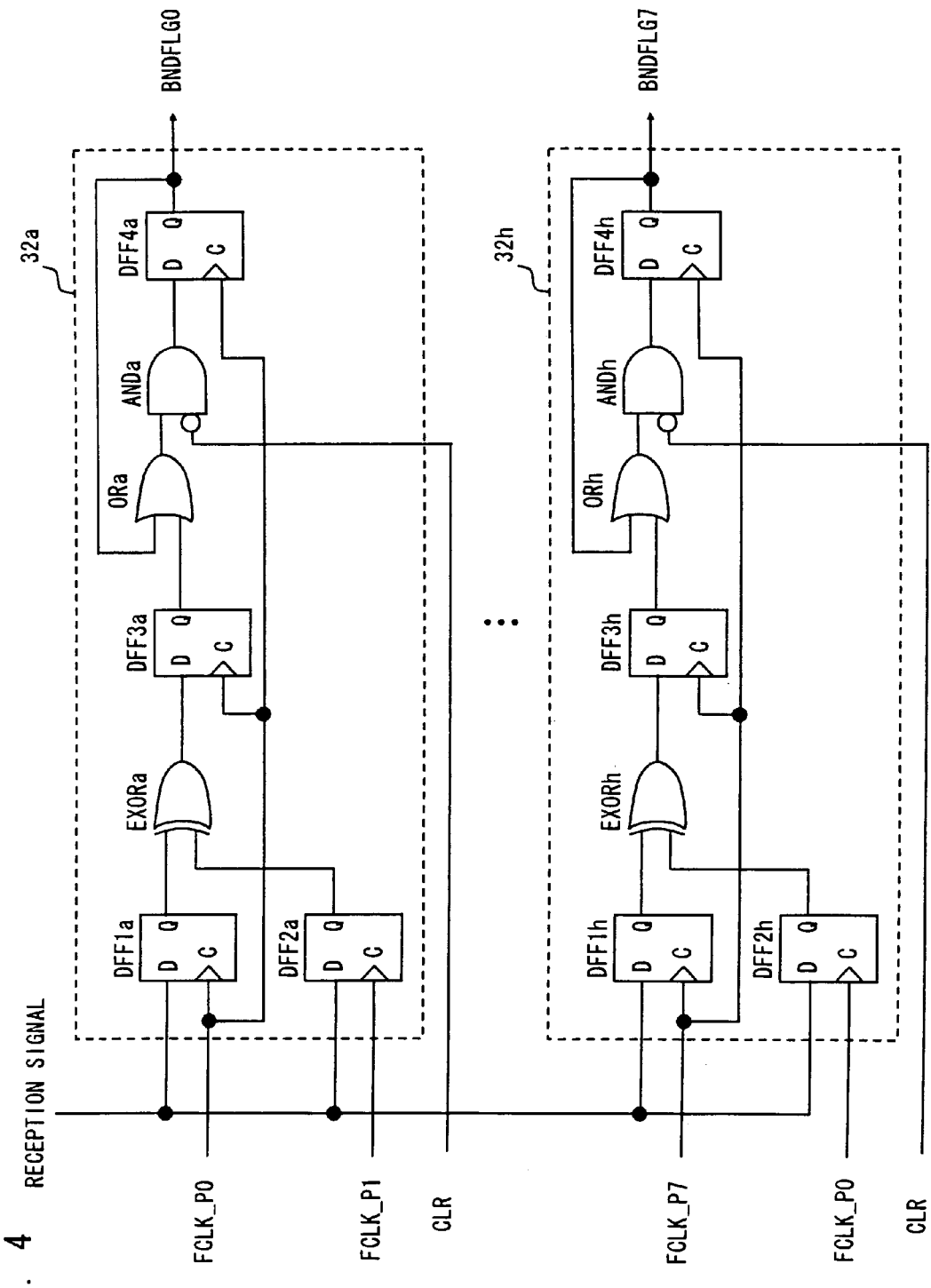
FIG. 4 is a block diagram illustrating a bit boundary detection circuit in accordance with a first exemplary embodiment of the present invention.

FIG. 4 is an example of a block diagram illustrating a configuration of the bit boundary detection circuit 32a. The bit boundary detection circuits 32a to 32h have the same configuration as each other. Therefore, the bit boundary detection circuit 32a is explained as a representative example with reference to FIG. 4. The bit boundary detection circuit 32a includes D-type flip-flops DFF1a to DFF4a (hereinafter, a D-type flip-flop may be simply referred to as DFF), an exclusive-OR circuit EXORa (hereinafter, it may be simply referred to as EXORa), an OR circuit ORa (hereinafter, it may be simply referred to as ORa), and an AND circuit ANDa (hereinafter, it may be simply referred to as ANDa). DFF1a to DFF4a take in a data value included in a signal that is input through a data terminal D at a rising edge of a clock that is input through an input terminal C, and output the value from an output terminal Q. EXORa performs an exclusive-OR operation on its input signals. ORa performs an OR operation on its input signals. ANDa performs an AND operation on its input signals.

Figure 5:
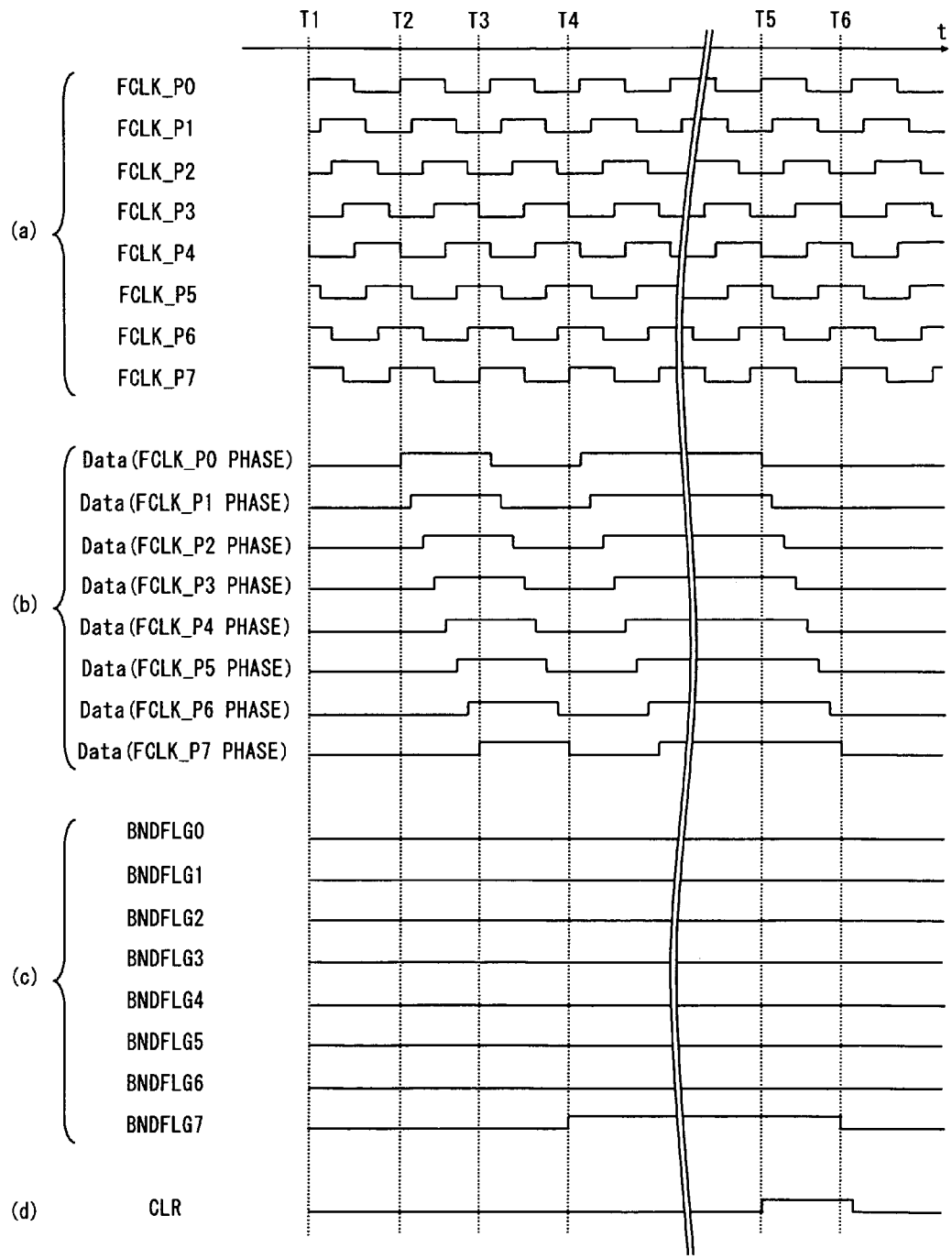
FIG. 5 is a timing chart illustrating an example of an operation of a bit boundary detection circuit in accordance with a first exemplary embodiment of the present invention.

FIG. 5 is an example of a timing chart illustrating an operational example of the bit boundary detection unit 32. The bit boundary detection circuits 32a to 32h receive a reception signal by using FCLK_P0 to FCLK_P7 shown in FIG. 5(a) and, by doing so, obtain data signals Data (FCLK_P0 phase) to Data (FCLK_P7 phase) (hereinafter, they may be simply referred to as Data (FCLK_P0 phase) to Data (FCLK_P7 phase)) shown in FIG. 5(b). For example, if DFF1a of the bit boundary detection circuit 32a receives a reception signal by using FCLK_P0, the output signal of DFF1a corresponds to Data (FCLK_P0 phase).

Then, for (FCLK_P0 phase) to Data (FCLK_P7 phase) shown in FIG. 5(b), each of the bit boundary detection circuits 32a to 32h compares respective two data signals of which the phases are adjacent to each other so that BNDFLG0 to BNDFLG7 shown in FIG. 5(c) are generated.

For example, in the bit boundary detection circuit 32h, the reception signal starts to be supplied to DFF2h at timing T1. DFF2h takes in data at timing T2 according to FCLK_P0. DFF3h takes in data at timing T3 according to FCLK_P7. Note that during the section from the timing T2 to T3, since Data (FCLK_P7 phase) from DFF1h and Data (FCLK_P0 phase) from DFF2h do not match with each other, the output of EXORh becomes a High level during the section from the timing T2 to T3.

DFF4h takes in data at timing T4 according to FCLK_P7. At this point, since the output of EXORh is the High level and the inverted signal of the CLR signal is also a High level, BNDFLG7 becomes a High-level. At timing T5, the CLR signal is input to ANDh, and the output of the ANDh thereby becomes a Low level. DFF4h takes in data at timing T6 according to FCLK_P7. At this point, since the output signal of ANDh is the Low level, BNDFLG7 becomes a Low-level. That is, the input to DFF4h is kept at a High-level from the timing T4 to the timing T5, and the input to DFF4h is reset to a Low level at the timing T5 at which the CLR signal is input. The other bit boundary detection circuits 32a to 32g operate in a similar manner, and output BNDFLG0 to BNDFLG6 respectively.

As described above, the bit boundary detection circuits 32a to 32h output BNDFLG0 to BNDFLG7 having a High level when a variation point of a reception signal exists between adjacent input clocks. In the example shown in FIG. 5, for example, since BNDFLG0 to BNDFLG6 are at a Low level and BNDFLG7 is at a High-level, it indicates that a variation point of the reception signal exists between FCLK_P7 and FCLK_P0.

Therefore, BNDFLG[n−1:0] shown in FIG. 3 is a parallel signal composed of a plurality of bits in which when a variation point of a reception signal exists between adjacent clocks input to the bit boundary detection circuits 32a to 32h, a corresponding bit becomes "1", and when no variation point of the reception signal exists between adjacent clocks input to the bit boundary detection circuits 32a to 32h, a corresponding bit becomes "0". The synchronous detection unit 30 outputs BNDFLG[n−1:0] to the clock phase selection unit 40. Examples of the parallel signal BNDFLG[n−1:0] supplied from the bit boundary detection circuits 32a to 32h include a signal expressed as "(BNDFLG7, BNDFLG6, BNDFLG5, . . . BNDFLG0)=(1, 0, 0, 0, 0, 0, 1, 1)". In this example, the signal indicates that a variation point of the reception signal exists between FCLK_P0 and FCLK_P1, between FCLK_P1 and FCLK_P2, and between FCLK_P7 and FCLK_P0.

The explanation continues hereinafter by referring to FIG. 1 again. The clock phase selection unit 40 selects one clock to be used for the sampling of the reception signal from FCLK_P[n−1:0] based on OKFLG[n−1:0] and BNDFLG[n−1:0] generated in the synchronous detection unit 30. The clock phase selection unit 40 outputs a selection signal CLKSEL[n−1:0] (hereinafter, it may be simply referred to as CLKSEL[n−1:0]) indicating the selected clock to a selector 81 of the FIFO unit 80. CLKSEL[n−1:0] is a parallel signal indicating an output from the clock phase selection unit 40. CLKSEL[n−1:0] is transmitted in parallel by using n signal lines. The clock phase selection unit 40 is explained hereinafter in a more detailed manner with reference to FIGS. 6 to 10.

Figure 6:
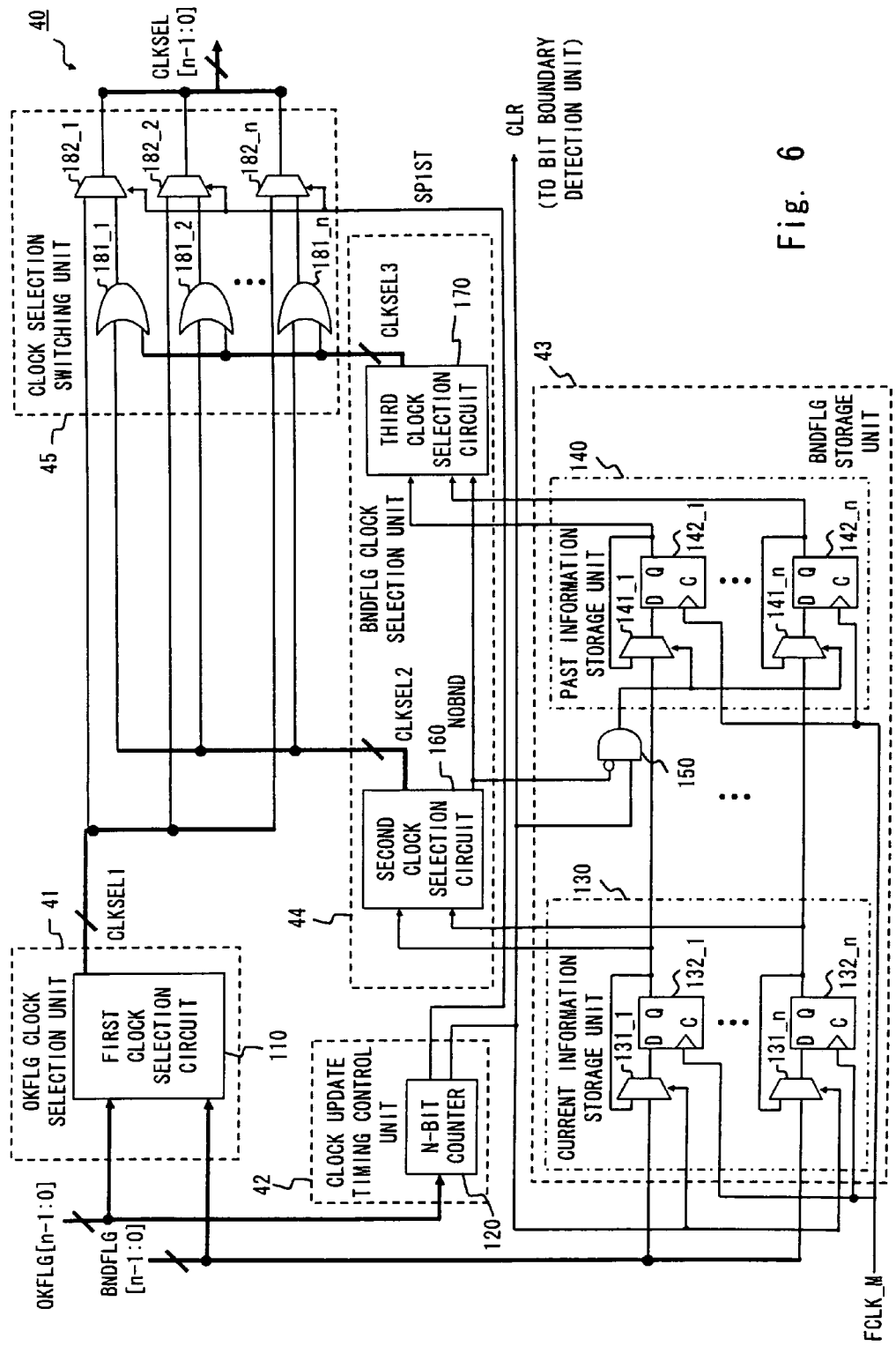
FIG. 6 is a block diagram illustrating a clock phase selection unit in accordance with a first exemplary embodiment of the present invention.

FIG. 6 is an example of a block diagram illustrating a configuration of the clock phase selection unit 40. As shown in FIG. 6, the clock phase selection unit 40 includes an OKFLG clock selection unit 41 as a second clock selection unit, a clock update timing control unit 42, a BNDFLG storage unit 43 as a bit boundary signal storage unit, a BNDFLG clock selection unit 44 as a first clock selection unit, and a clock selection switching unit 45.

The OKFLG clock selection unit 41 includes a first clock selection circuit 110. In the reception of synchronous word data, the first clock selection circuit 110 selects one clock from FCLK_P[n−1:0] based on OKFLG[n−1:0] and BND- FLG[n−1:0], and outputs a selection signal CLKSEL1 (hereinafter, it may be simply referred to as CLKSEL1) indicating the selected clock. CLKSEL1 is a parallel signal indicating a sampling clock used for the reception of synchronous word data. CLKSEL1 is transmitted in parallel by using n signal lines.

In this exemplary embodiment, the first clock selection circuit 110 selects one clock, which is a synchronously-detected clock indicated by OKFLG[n−1:0] and is away from a variation point of the reception signal indicated by BNDFLG [n−1:0] by a predetermined phase, from FCLK_P[n−1:0] as CLKSEL1. For example, if a clock whose phase is away from the variation point of the reception signal by the largest amount is to be selected, a clock whose phase is different by 180 degrees is selected. Therefore, assume a case where the first clock selection circuit 110 selects one-phase FCLK_P [n−1:0] from eight-phase FCLK_P[n−1:0], for example, and the first clock selection circuit 110 receives a signal "(OKFLG7, OKFLG6, OKFLG5, . . . OKFLG0)=(0, 0, 1, 1, 1, 1, 1, 0)" as OKFLG[n−1:0] and a signal "(BNDFLG7, BNDFLG6, BNDFLG5, . . . BNDFLG0)=(1, 0, 0, 0, 0, 0, 1, 1)" as BNDFLG[n−1:0]. In this case, the first clock selection circuit 110 selects the center clock, i.e., FCLK_P3 from the selectable clocks FCLK_P1 to FCLK_P5. Then, the first clock selection circuit 110 outputs "00001000" as CLKSEL1.

The clock update timing control unit 42 controls timing at which the sampling clock is updated during the reception of payload data. Therefore, the clock update timing control unit 42 generates a CLR signal at predetermined intervals in order to control bit boundary detection processing in the bit boundary detection unit 32 and bit boundary signal storage processing in the BNDFLG storage unit 43 (which is explained later). Further, the clock update timing control unit 42 generates an SP1ST signal at the timing at which the reception of payload data starts in order to control clock selection switching processing in the clock selection switching unit 45 (which is explained later). Note that the CLR signal is a one-shot pulse signal and the SP1ST is a signal that changes from a Low level to a High level.

The clock update timing control unit 42 generates a CLR signal, for example, at each of the timings at which a predetermined number of bits (N bits) of the payload data are received. The predetermined number of bits is determined, for example, according to the number of stages of the FIFO of the S/P converter 82. Note that the clock update timing control unit 42 can detect the completion of reception processing for the synchronous word data by receiving OKFLG[n−1:0] from the synchronous detection unit 30. To that end, the clock update timing control unit 42 uses an N-bit counter 120 to count the number of bits of payload data. In particular, the clock update timing control unit 42 starts counting the number of bits of payload data at timing at which OKFLG[n−1:0] is received, and generates a CLR signal every time N bits of the payload data are received. In this way, the clock update timing control unit 42 can control the update timing of the sampling clock that is used during the payload reception in units of N bits.

The BNDFLG storage unit 43 includes a current information storage unit 130 as a first bit boundary signal storage unit, a past information storage unit 140 as a second bit boundary signal storage unit, and an AND circuit 150. Bit boundary signal storage processing in the BNDFLG storage unit 43 is controlled based on the CLR signal output from the clock update timing control unit 42 and a NOBND signal output from the BNDFLG clock selection unit 44 (which is explained later).

The current information storage unit 130 stores BNDFLG [n−1:0] every time at timing controlled by the clock update timing control unit 42. Since the current information storage unit 130 stores BNDFLG[n−1:0] every time, it retains the bit boundary signal of the reception signal at the current timing.

The past information storage unit 140 takes in and stores a signal stored in the current information storage unit 130 when a variation point of the reception signal is detected in the bit boundary detection unit 32, but does not update the signal stored therein when no variation point of the reception signal is detected. When the current information storage unit 130 stores BNDFLG[n−1:0] at timing controlled by the clock update timing control unit 42, the past information storage unit 140 takes in and stores a signal stored in the current information storage unit 130 or retains the signal that has been stored in the past information storage unit 140 until that timing without updating the value according to whether a variation point of the reception signal is detected or not in the bit boundary detection unit 32. That is, the past information storage unit 140 retains the bit boundary signal that was stored before the BNDFLG[n−1:0] currently stored in the current information storage unit 130 and was generated at the time when a variation point of the reception signal was detected in the bit boundary detection unit 32.

The current information storage unit 130 includes selectors 131_1 to 131_n and DFFs 132_1 to 132_n. The selectors 131_1 to 131_n select BNDFLG[n−1:0] or the output values of the DFFs 132_1 to 132_n based on the CLR signal, and output the selected data to the DFFs 132_1 to 132_n. The DFFs 132_1 to 132_n receive output values from the selectors 131_1 to 131_n at data terminals D, and receive a reference clock FCLK_M (hereinafter, it may be simply referred to as FCLK_M) at clock input terminals C. Then, the DFFs 132_1 to 132_n take in input data values at a rising edge of FCLK_M, and output the values from output terminals Q. Output values from the DFFs 132_1 to 132_n are input to the selectors 131_1 to 131_n, a second clock selection circuit 160 (which is explained later), and selectors 141_1~141_n of the past information storage unit 140 (which is explained later). In this way, the current information storage unit 130 takes in input data of BNDFLG[n−1:0] by using the CLR signal as a trigger signal, and retains the taken data in DFFs 132_1 to 132_n until the next CLR signal is input.

The past information storage unit 140 includes selectors 141_1~141_n and DFFs 142_2 to 142_n. The selectors 141_1~141_n select the output values of the DFFs 132_1 to 132_n of the current information storage unit 130 or the output values of the DFFs 142_2 to 142_n based on an output signal from the AND circuit 150, and output the selected data to the DFFs 142_2 to 142_n. The DFFs 142_2 to 142_n receive output values from the selectors 141_1~141_n at data terminals D, and receive FCLK_M at clock input terminals C. Then, the DFFs 142_2 to 142_n take in input data values at a rising edge of FCLK_M, and output the values from output terminals Q. Output values from the DFFs 142_2 to 142_n are input to the selectors 141_1~141_n and a third clock selection circuit 170. In this way, the past information storage unit 140 takes in data of BNDFLG[n−1:0] input from the current information storage unit 130 by using the output signal from the AND circuit 150 as a trigger signal, and retains the taken data in DFFs 142_2 to 142_n until the next output signal from the AND circuit 150 is supplied.

The AND circuit 150 receives the CLR signal and a NOBND signal (which is explained later). The AND circuit 150 outputs a result of the AND operation of two inputs. As described later, when the bit boundary signal output from the current information storage unit 130 indicates that the reception signal is continuous data in which a certain signal level continues, the second clock selection circuit 160 outputs, for example, a NOBND signal indicating "1". Therefore, if the NOBND signal is "1", the AND circuit 150 outputs "0" regardless of the value of the CLR signal. In this case, the past information storage unit 140 does not take in the bit boundary signal of the current information storage unit 130. In contrast to that, if the NOBND signal is "0" and the CLR signal is "1", the AND circuit 150 outputs "1" and the past information storage unit 140 thereby takes in the bit boundary signal of the current information storage unit 130. That is, the NOBND signal is used as a mask signal used to control whether the bit boundary signal of the current information storage unit 130 is taken in to the past information storage unit 140 or not.

The BNDFLG clock selection unit 44 includes a second clock selection circuit 160 as a first clock selection circuit and a third clock selection circuit 170 as a second clock selection circuit. The BNDFLG clock selection unit 44 selects one clock from FCLK_P[n−1:0] based on BNDFLG[n−1:0] stored in the current information storage unit 130 and BND-FLG[n−1:0] stored in the past information storage unit 140, and outputs selection signals CLKSEL2 and CLKSEL3 (hereinafter, they may be simply referred to as CLKSEL2 and CLKSEL3 respectively) indicating the selected clock. As described later, the BNDFLG clock selection unit 44 outputs CLKSEL3 by using the third clock selection circuit 170 when BNDFLG[n−1:0] stored in the current information storage unit 130 indicates that the reception signal is continuous data, and outputs CLKSEL2 by using the second clock selection circuit 160 when BNDFLG[n−1:0] indicates otherwise. Note that each of CLKSEL2 and CLKSEL3 is a parallel signal indicating a sampling clock used for the reception of payload data. Each of CLKSEL2 and CLKSEL3 is transmitted in parallel by using n signal lines.

When a variation point of a reception signal is detected in the bit boundary detection unit 32 at timing controlled by the clock update timing control unit 42, the second clock selection circuit 160 selects one clock from FCLK_P[n−1:0] based on data of BNDFLG[n−1:0] stored in the current information storage unit 130, and outputs CLKSEL2. Further, the second clock selection circuit 160 generates a NOBND signal based on data of BNDFLG[n−1:0] output from the current information storage unit 130.

Note that if a serial data series included in an input reception signal is continuous data in which a certain signal level continues (e.g., data series in which "0" or "1" continues, expressed "0xFFFF" or "0x0000" in the hexadecimal number system), the bit boundary detection unit 32 cannot detect a variation point in the reception signal. Therefore, during the reception of payload data that is divided in units of a predetermined number of bits (N bits), if a serial data series in one of the sections is continuous data, all the output values of BNDFLG[n−1:0] detected based on that section become "0". In such a situation, the second clock selection circuit 160 brings all the output values of CLKSEL2 to "0", and brings the output value of NOBND to "1". In contrast to that, when at least one of the output values of BNDFLG[n−1:0] stored in the current information storage unit 130 is not "0" (i.e., when the bit boundary detection unit 32 can detect a variation point in the reception signal), the second clock selection circuit 160 selects one clock from FCLK_P[n−1:0] based on BNDFLG[n−1:0] stored in the current information storage unit 130, outputs CLKSEL2 of which the output value indicating the selected clock is "1", and brings the output value of NOBND to "0".

In this exemplary embodiment, the second clock selection circuit 160 selects one clock, which is away from the variation point of the reception signal indicated by BNDFLG[n−1:0] stored in the current information storage unit 130 by a predetermined phase, from FCLK_P[n−1:0] as CLKSEL2. For example, if a clock whose phase is different from the variation point of the reception signal by the largest amount is to be selected, a clock whose phase is different by 180 degrees is selected. Clock selection processing by the second clock selection circuit 160 is explained hereinafter in a concrete manner with reference to FIGS. 7 to 9.

Figure 7:
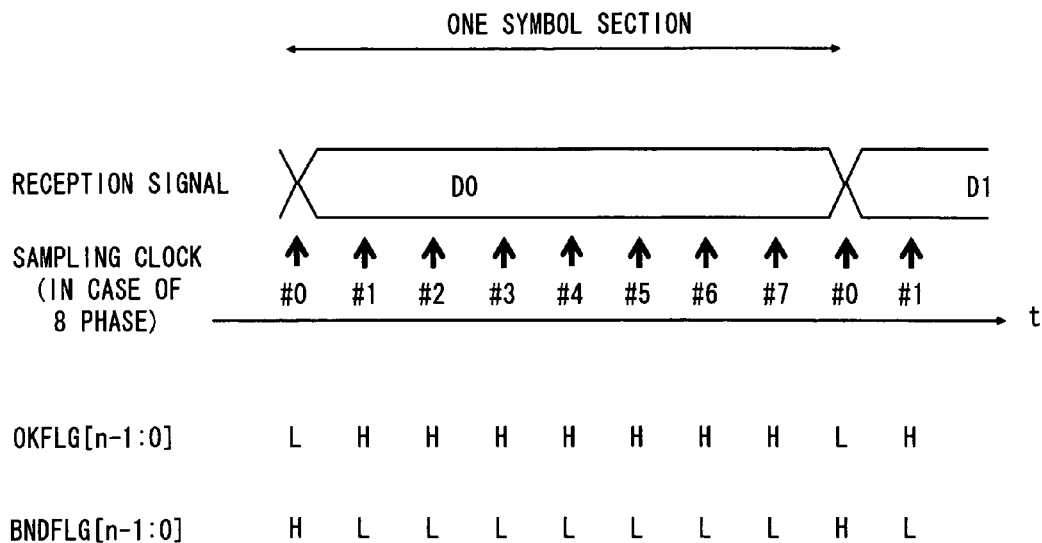
FIG. 7 is a diagram for explaining an example of a clock selection performed by a clock phase selection unit in accordance with a first exemplary embodiment of the present invention.

As shown in a signal waveform in FIG. 7, in a situation where the influence exerted on the reception signal by a jitter component is negligible and no noise is mixed into the data or in a similar situation, OKFLG[n−1:0] and BNDFLG[n−1:0] output from the synchronous detection unit 30 have such output values that the output values of their corresponding bits are mutually opposite values, i.e., "1" and "0" (that is, they become signals in which High level and Low level are reversed from each other). Therefore, the clock having the center phase among the synchronously-detected clocks (i.e., the clock having the center phase in the phase of the section in which the output value of OKFLG[n−1:0] is a High level) matches with the clock whose phase is different from the variation point of the reception signal by the largest amount (i.e., the clock whose phase is different by 180 degrees from the phase at which the output value of BNDFLG[n−1:0] is a High level). Therefore, for the signal waveform shown in FIG. 7, the second clock selection circuit 160 selects a clock indicated as #4 (i.e., FCLK_P4), for example, and outputs "00010000" as CLKSEL2.

Figure 8:
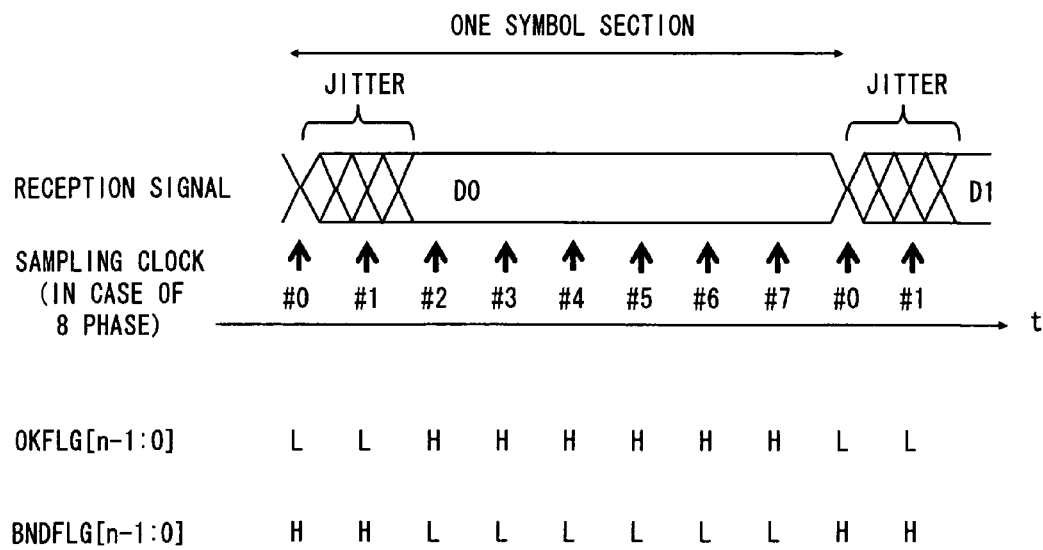
FIG. 8 is a diagram for explaining an example of a clock selection performed by a clock phase selection unit in accordance with a first exemplary embodiment of the present invention.

As shown in a signal waveform in FIG. 8, in a situation where a variation point of the reception signal fluctuates due to the change of the jitter component, the bit boundary detection unit 32 may detect two or more variation points in the reception signal. As a result, the output values of two or more bits may become "1" in the output value of BNDFLG[n−1:0] output from the synchronous detection unit 30 (at the same time, the output values of two or more bits may become "0" in the output value of OKDFLG[n−1:0] output from the synchronous detection unit 30). Therefore, for the signal waveform shown in FIG. 8, the second clock selection circuit 160 selects a clock whose phase is different from these two or more clocks for which a variation point of the reception signal exists by the largest amount. For example, the second clock selection circuit 160 selects a clock indicated as #5 (i.e., FCLK_P5), for example, and outputs "00100000" as CLKSEL2.

Figure 9:
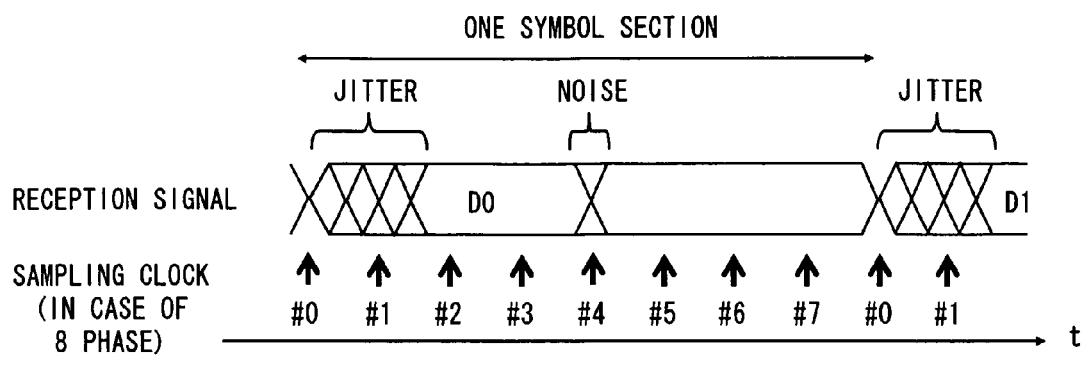
FIG. 9 is a diagram for explaining an example of a clock selection performed by a clock phase selection unit in accordance with a first exemplary embodiment of the present invention.

Note that as shown in a signal waveform in FIG. 9, in a situation where noise occurs halfway through the data and a variation point is thereby detected at the center phase in the section in which the output signal of BNDFLG[n−1:0] is a High level in the reception signal, the second clock selection circuit 160 cannot select any clock as a sampling clock. Therefore, the current information storage unit 130 outputs "00000000" as CLKSEL2 and brings the output value of the NOBND signal to "1".

When a variation point of a reception signal is not detected in the bit boundary detection unit 32 at timing controlled by the clock update timing control unit 42, the third clock selection circuit 170 selects one clock from FCLK_P[n−1:0] based on BNDFLG[n−1:0] stored in the past information storage unit 140, and outputs CLKSEL3. When the output value of the NOBND signal is "1", the second clock selection circuit 160 brings all the output values of CLKSEL3 to "0". Further, when the output value of the NOBND signal is "1" (i.e., when the second clock selection circuit 160 cannot performs the clock selection), the third clock selection circuit 170 selects one clock from FCLK_P[n−1:0] based on BNDFLG[n−1:0]

stored in the past information storage unit 140, and outputs CLKSEL3 of which the output value indicating the selected clock is "1"

In this exemplary embodiment, the third clock selection circuit 170 selects one clock, which is away from the variation point of the reception signal indicated by BNDFLG[n−1:0] stored in the past information storage unit 140 by a predetermined phase, from FCLK_P[n−1:0] as CLKSEL3. For example, if a clock whose phase is different from the variation point of the reception signal by the largest amount is to be selected, a clock whose phase is different by 180 degrees is selected.

Therefore, assume a case where the third clock selection circuit 170 selects one-phase FCLK_P[n−1:0] from eight-phase FCLK_P[n−1:0], for example, and the third clock selection circuit 170 receives a signal (BNDFLG7, BNDFLG6, BNDFLG5, . . . BNDFLG0)=(1, 0, 0, 0, 0, 0, 0, 0)" as BNDFLG[n−1:0]. In this case, the third clock selection circuit 170 determines that a variation point of the reception signal exits between FCLK_P7 and FCLK_P0, and thereby selects FCLK_P3, which is away from the variation point of the reception signal by a predetermined phase. Then, the third clock selection circuit 170 outputs "00001000" as CLKSEL3.

The explanation continues hereinafter by referring to FIG. 6 again. The clock selection switching unit 45 selects one clock selection signal from CLKSEL1 output from the OKFLG clock selection unit 41, CLKSEL2 and CLKSEL3 output from the BNDFLG clock selection unit 44 at timing controlled by the clock update timing control unit 42, and outputs the selected clock selection signal as CLKSEL[n−1: 0].

The clock selection switching unit 45 includes OR circuits 181_1 to 181_n and selectors 182_1 to 182_n. The selectors 182_1 to 182_n select CLKSEL1 or the output value from the OR circuits 181_1 to 181_n (i.e., CLKSEL2 or CLKSEL3) based on SP1ST, and outputs the selected data as CLKSEL[n−1:0]. In this way, when the first N bits of payload data is received after the reception of synchronous word data, CLKSEL1 is selected as CLKSEL[n−1:0]. Then, during the reception of the subsequent payload data, CLKSEL2 or CLKSEL3 is selected as CLKSEL[n−1:0]. Therefore, the clock selection switching unit 45 can switch the sampling clock used for reception according to whether the data portion of the reception signal to be received is synchronous word data or payload data.

The explanation continues hereinafter by referring to FIG. 1 again. The second PLL circuit 50 generates FCLK_M and FCLK_P[n−1:0]. The second PLL circuit 50 outputs the generated FCLK_P[n−1:0] to the synchronous detection unit 30 and the clock transfer processing unit 70. Further, the second PLL circuit 50 outputs the generated FCLK_M to the clock transfer processing unit 70. Each of FCLK and FCLK_P[n−1:0] in this exemplary embodiment is a high-speed clock obtained by multiplying a reference clock. Further, FCLK_P [n−1:0] is composed of a plurality of clocks which have the same rate but are mutually different in phase by 360°/n. This exemplary embodiment is explained on the assumption that n is eight. Therefore, the outputs of the second PLL circuit 50 includes an output of one bit in width and an output of eight bits in width in which each bit corresponds to a clock of one phase. Further, in this exemplary embodiment, the first PLL circuit 23 and the second PLL circuit 50 generate clocks that are obtained by multiplying the same reference clock, have the same frequency, and are asynchronous to each other.

The clock transfer processing unit 70 receives a data signal output from the synchronous detection unit 30 with FCLK_P [n−1:0], and performs asynchronous transfer processing to transfer the received data signal to FCLK_M. The circuits at stages subsequent to the clock transfer processing unit 70 operate with the one-phase FCLK_M. In contrast to that, the circuits at stages preceding the clock transfer processing unit 70 operate with FCLK_P[n−1:0]. Therefore, the asynchronous transfer processing to FCLK_M is performed in the clock transfer processing unit 70.

As shown in FIG. 2, an elastic store unit 71 is formed by using a plurality of elastic store circuits 71a to 71h in the clock transfer processing unit 70. Note that in FIG. 2, explanation is made on the assumption that the elastic store circuits 71a to 71h operate by using eight clocks FCLK_P0 to FCLK_P7 having mutually different phases and a clock FCLK_M.

The elastic store circuits 71a to 71h shown in FIG. 2 sample data signals Data_P0 to Data_P7 output from the synchronous pattern detectors 31a to 31h by using FCLK_P0 to FCLK_P7. Next, the elastic store circuits 71a to 71h stretch the data signals Data_P0 to Data_P7 by using an elastic store memory (not shown). Then, the elastic store circuits 71a to 71h readjust the timing of the stretched data signals with FCLK_M and output the readjusted data signals as Data_M0 to Data_M7 to the FIFO unit 80. Data_M[n−1:0] is a parallel signal indicating output signals from the elastic store circuits 71a to 71h Data_M0 to Data_M7 are transmitted in parallel by using n signal lines. Note that in this exemplary embodiment, the data signals Data_M0 to Data_M7 are payload data. As described above, by stretching the data signal Data_P using the elastic store circuit 71a to 71h, the sampling can be correctly performed by using FCLK_M regardless of which FCLK_P is used in the reception of the data signal Data_P.

The FIFO unit 80 includes a selector 81 and a serial-to-parallel converter (S/P converter) 82. The selector 81 selects one of data signals output from the clock transfer processing unit 70 based on CLKSEL[n−1:0], and outputs the selected data to the S/P converter 82. The S/P converter 82 converts serial data sampled in the FIFO unit 80 into parallel data by synchronizing it to a reference clock SCLK for the internal circuits and outputs the converted parallel data.

The signal processing circuit 90 performs signal processing (e.g., decode processing including path search of the received data) based on the parallel data output from the S/P converter 82, and generates a control signal and/or a data signal used in circuits at subsequent stages (not shown).

Note that the transmission of the received signal from the RF unit 2 to the DBB unit 3 is preferably implemented by converting the received signal into an LVDS (Low Voltage Differential Signaling) serial signal and then transmitting the converted signal to the synchronous detection unit. For example, a serial reception signal from a P/S converter 22 may be differentially amplified and transmitted by using a driver, and the differential signal may be received by a receiver. Further, a reception signal may be transmitted by using two signal lines in which the reception signal and the inverted signal of the reception signal are transmitted through respective signal lines. In this way, even when data transmission/reception is to be performed at a high speed by using a low-voltage reception signal, the tolerance to noise can be improved by transmitting differential signals using two signal lines. Further, the transmission of a reception signal from the DBB unit 3 to the RF unit 2 is also preferably implemented by converting the reception signal into an LVDS (Low Voltage Differential Signaling) serial signal and transmitting the converted signal to the synchronous detection unit.

Figure 10:
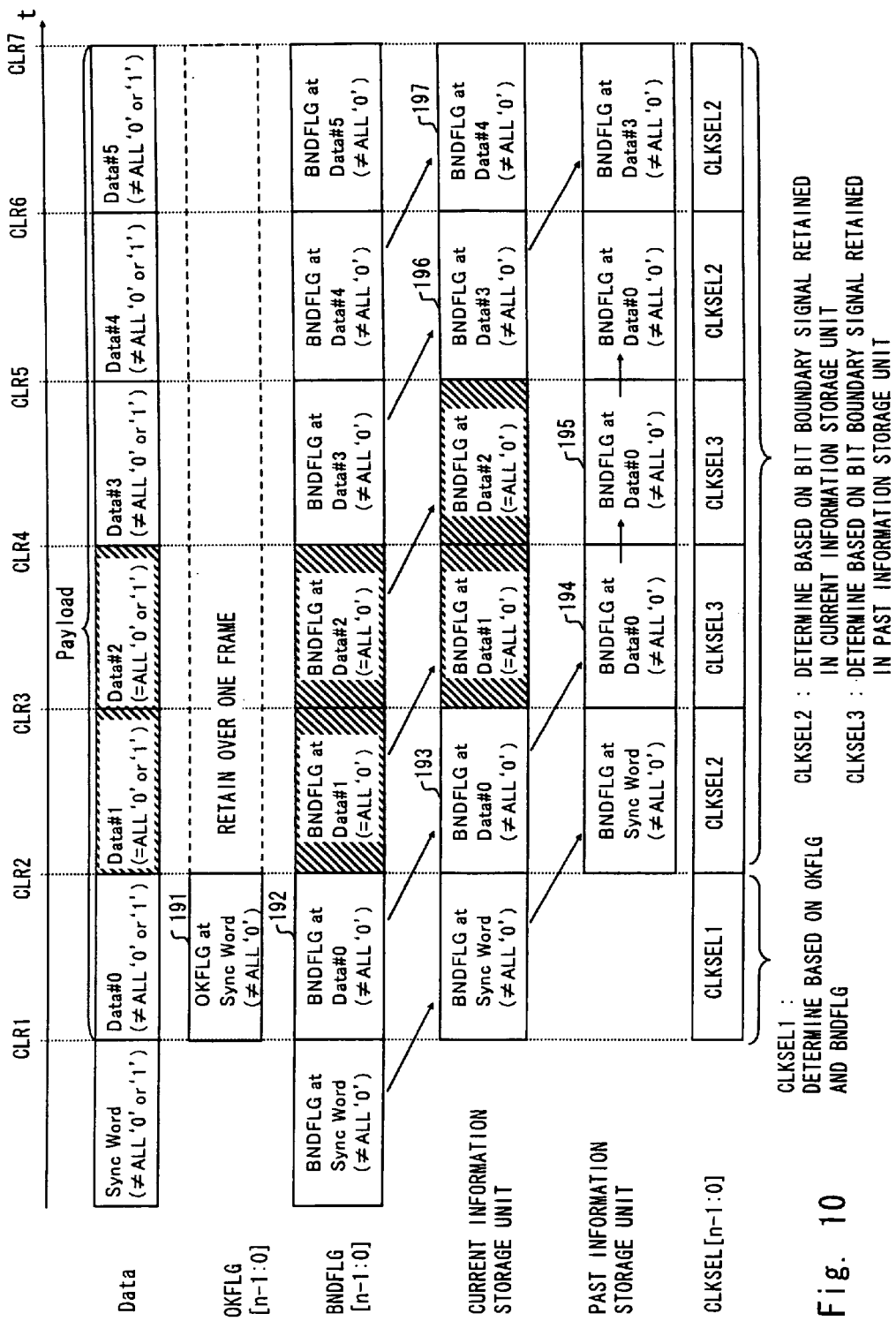
FIG. 10 is a timing chart for explaining an example of an operation of a clock phase selection unit in accordance with a first exemplary embodiment of the present invention.
Figure 11:
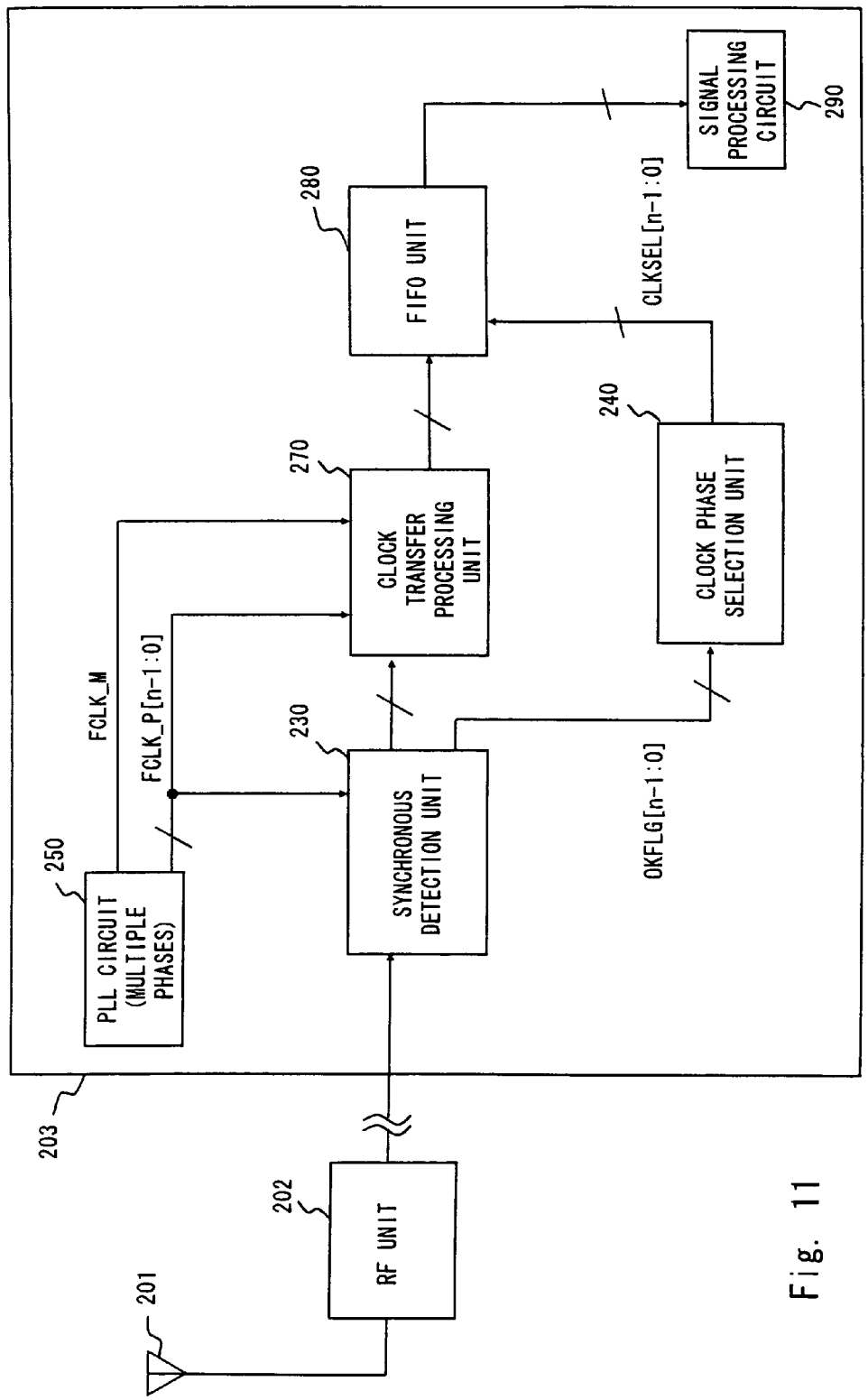
FIG. 11 is a block diagram illustrating a receiving device relating to the present invention.
Figure 12:
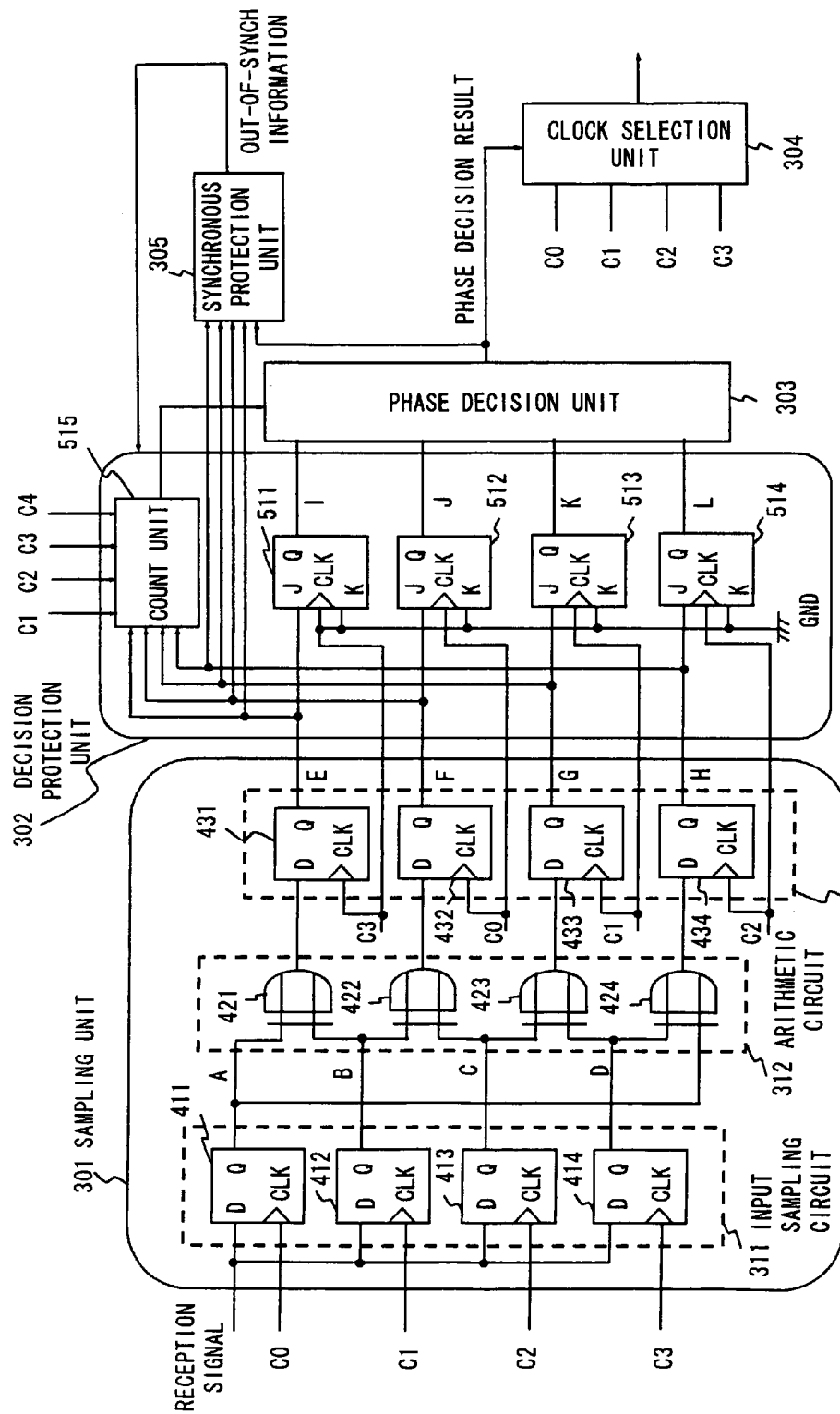
FIG. 12 is a block diagram illustrating a phase decision circuit relating to the present invention.
Figure 13:
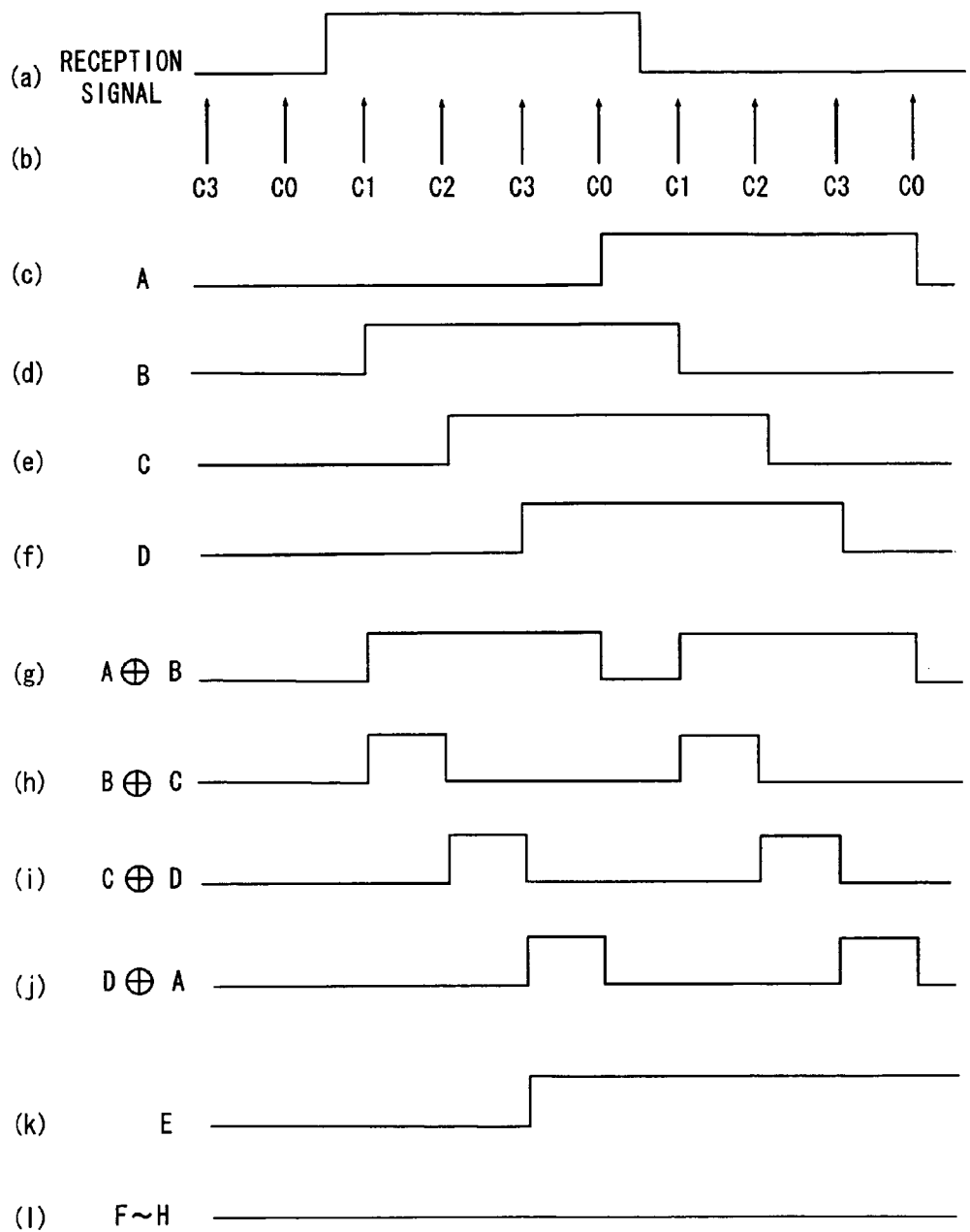
FIG. 13 is an operation waveform chart of a phase decision circuit relating to the present invention.
Figure 14:
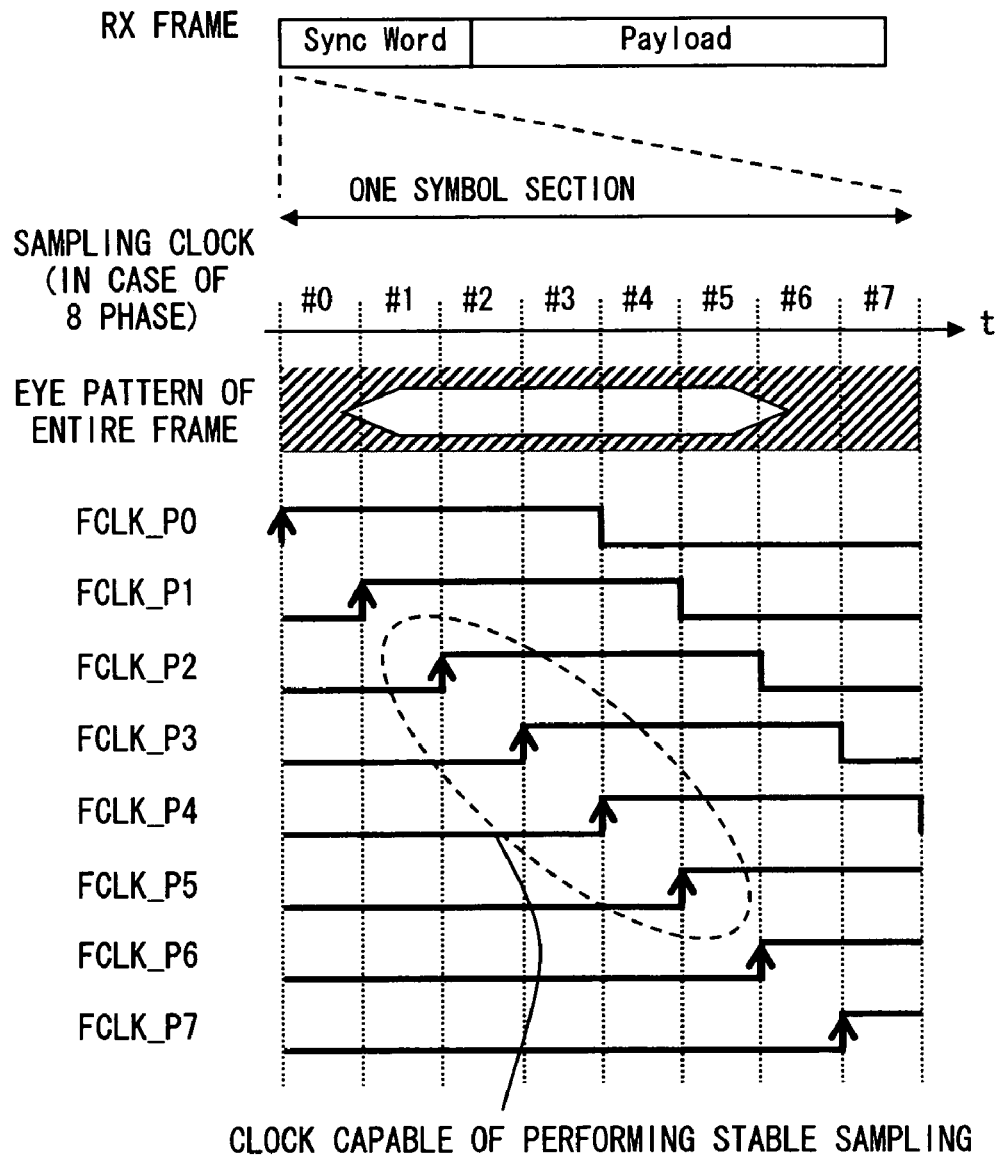
FIG. 14 is a diagram for explaining a problem to be solved by the present invention.
Figure 15A:
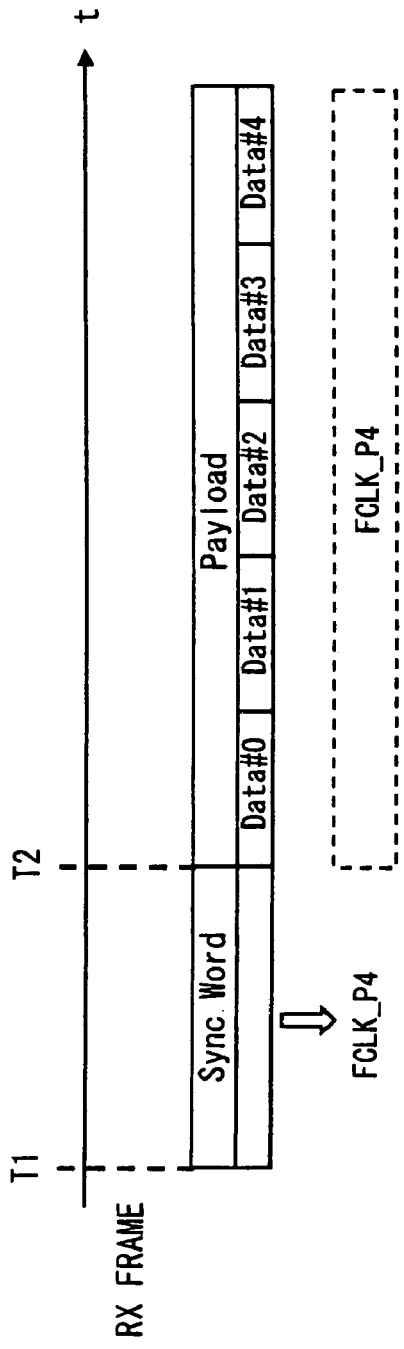
FIG. 15A is a diagram for explaining a problem to be solved by the present invention.
Figure 15B:
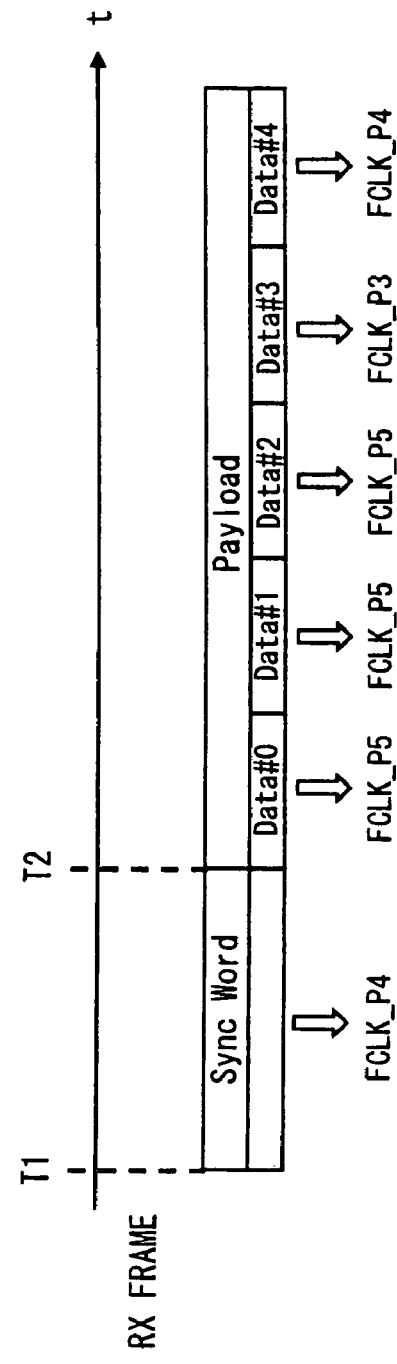
FIG. 15B is a diagram for explaining a problem to be solved by the present invention.

Next, a clock selection processing operation performed in the clock phase selection unit 40 is explained hereinafter with reference to FIG. 10. FIG. 10 is a timing chart for explaining a clock selection processing operation. Data is serial data of an input reception signal, and represented as a plurality of data portions Data #0 to #5 that are obtained by dividing the payload data in units of a predetermined number of bits. For example, payload data may be divided in units of N bits that are determined according to the number of stages of the FIFO of the S/P converter 82. The clock phase selection unit 40 updates the sampling clock that is used when these data portions Data #0 to #5 are received. To that end, after the synchronous word data is received, the clock phase selection unit 40 generates CLR1 to CLR7 every time N bits of the payload data are received. That is, the timing of CLR1 to CLR7 serves as the switching unit of CLKSEL[n−1:0] indicating the sampling clock. Note that the data indicated by hatching in the figure represents continuous data.

Firstly, the synchronous pattern detection unit 31, which has received the reception signal, performs synchronous detection processing based on the synchronous word data to generate OKFLG[n−1:0]. The output values of the generated OKFLG[n−1:0] are retained over one frame in the reception of the payload data subsequent to the synchronous word data.

Further, the bit boundary detection unit 32 starts bit boundary detection processing at the same instant as the reception signal is received, and generates BNDFLG[n−1:0]. BNDFLG[n−1:0] is updated at the timing of the CLR signal during the reception of the payload data subsequent to the synchronous word data.

Upon reception of input of OKFLG[n−1:0], the clock update timing control unit 42 determines that the reception of the payload data is started and thereby generates CLR1. In response to CLR1, the current information storage unit 130 takes in the data of BNDFLG[n−1:0] based on the synchronous word data and stores its value. Then, the bit boundary detection unit 32 resets the output value to the initial value, and generates BNDFLG[n−1:0] based on Data #0.

Further, the first clock selection circuit 110 generates CLKSEL1 based on OKFLG[n−1:0] (data indicated by the sign 191 in the figure) and BNDFLG[n−1:0] (data indicated by the sign 192 in the figure). The clock selection switching unit 45 selects CLKSEL1 and outputs it as CLKSEL[n−1:0].

Next, the clock update timing control unit 42 determines that the first N bits have been received after the reception of the payload data was started, and thereby generates CLR2 and SP1ST. In response to CLR2, the current information storage unit 130 takes in the data of BNDFLG[n−1:0] based on Data #0 and stores its value. Then, the bit boundary detection unit 32 resets the output value to the initial value, and generates BNDFLG[n−1:0] based on Data #1. Further, since the data of BNDFLG[n−1:0] based on the synchronous word data is, according to the NOBND signal and CLR2, data for which a variation point of the reception signal is detected, the past information storage unit 140 takes in the data of BNDFLG[n−1:0] based on the synchronous word data and stores its value.

Further, the second clock selection circuit 160 generates CLKSEL2 based on BNDFLG[n−1:0] (data indicated by the sign 193 in the figure). The clock selection switching unit 45 selects CLKSEL2 according to SP1ST and outputs it as CLKSEL[n−1:0].

At the same time, since the data of BNDFLG[n−1:0] stored in the current information storage unit 130 (data of BNDFLG[n−1:0] based on the synchronous word data) indicates that a variation point of the reception signal can be detected, the second clock selection circuit 160 brings the output value of the NOBND signal to "0".

Next, the clock update timing control unit 42 determines that the next N bits of the payload data have been received, and thereby generates CLR3. In response to CLR3, the current information storage unit 130 takes in the data of BNDFLG[n−1:0] based on Data #1 and stores its value. Then, the bit boundary detection unit 32 resets the output value to the initial value, and generates BNDFLG[n−1:0] based on Data #2. Further, since the data of BNDFLG[n−1:0] based on Data #0 is, according to the NOBND signal and CLR3, data for which a variation point of the reception signal is detected, the past information storage unit 140 takes in the data of BNDFLG[n−1:0] based on Data #0 and stores its value.

Further, since the data of BNDFLG[n−1:0] based on Data #1 indicates that a variation point of the reception signal cannot be detected, the second clock selection circuit 160 brings all the output values to "0" and brings the output value of the NOBND signal to "1". In response to this, the third clock selection circuit 170 generates CLKSEL3 based on the data of BNDFLG[n−1:0] based on Data #0 (data indicated by the sign 194 in the figure). The clock selection switching unit 45 selects CLKSEL3 according to CLR3 and outputs it as CLKSEL[n−1:0].

Next, the clock update timing control unit 42 determines that the next N bits of the payload data have been received, and thereby generates CLR4. In response to CLR4, the current information storage unit 130 takes in the data of BNDFLG[n−1:0] based on Data #2 and stores its value. Then, the bit boundary detection unit 32 resets the output value to the initial value, and generates BNDFLG[n−1:0] based on Data #3. In this case, the past information storage unit 140 does not take in the output signal from the current information storage unit 130 because the output value of the NOBND signal is "1". Therefore, the past information storage unit 140 retains the data of BNDFLG[n−1:0] based on Data #0, which was taken in according to CLR3.

Further, since the data of BNDFLG[n−1:0] based on Data #2 indicates that a variation point of the reception signal cannot be detected, the second clock selection circuit 160 brings all the output values to "0" and brings the output value of the NOBND signal to "1". In response to this, the third clock selection circuit 170 generates CLKSEL3 based on the data of BNDFLG[n−1:0] based on Data #0 (data indicated by the sign 195 in the figure). The clock selection switching unit 45 selects CLKSEL3 according to CLR4 and outputs it as CLKSEL[n−1:0].

Next, the clock update timing control unit 42 determines that the next N bits of the payload data have been received, and thereby generates CLR5. In response to CLR5, the current information storage unit 130 takes in the data of BNDFLG[n−1:0] based on Data #3 and stores its value. Then, the bit boundary detection unit 32 resets the output value to the initial value, and generates BNDFLG[n−1:0] based on Data #4. In this case, the past information storage unit 140 does not take in the output signal from the current information storage unit 130 because the output value of the NOBND signal is "1". Therefore, the past information storage unit 140 retains the data of BNDFLG[n−1:0] based on Data #0, which was taken in according to CLR3.

Further, since the data of BNDFLG[n−1:0] based on Data #3 indicates that a variation point of the reception signal is detected, the second clock selection circuit 160 generates CLKSEL2 based on BNDFLG[n−1:0] based on Data #3 (data indicated by the sign 196 in the figure) At the same time, the second clock selection circuit 160 brings the output value of the NOBND signal to "0". The clock selection switching unit 45 selects CLKSEL2 according to CLR5 and outputs it as CLKSEL[n−1:0].

Next, similarly to the processing at the update timing of CLR2, new data of BNDFLG[n−1:0] is taken in to the current information storage unit 130 and the past information storage unit 140 at the update timing of CLR6. Then, the second clock selection circuit 160 generates CLKSEL2 based on BNDFLG [n−1:0] based on Data #4 (data indicated by the sign 197 in the figure), selects CLKSEL2 according to CLR6, and outputs it as CLKSEL[n−1:0].

As described above, when the data series is continuous data in the section between Data #1 and Data #2 of the payload data, the bit boundary detection unit 32 cannot detect a variation point of the reception signal. Therefore, the clock phase selection unit 40 brings all the output values of CLKSEL2 to "0", and outputs CLKSEL3, instead of CLKSEL2, as CLKSEL[n−1:0]. That is, in the example shown in the figure, the clock phase selection unit 40 outputs CLKSEL[n−1:0] in the order of CLKSEL1, CLKSEL2, CLKSEL3, CLKSEL3, CLKSEL2, and CLKSEL2 at the timing of the respective CLR signals. Therefore, when one-phase FCLK_P[n−1:0] is to be selected from eight-phase FCLK_P[n−1:0] as CLKSEL [n−1:0], for example, the clock phase selection unit 40 updates the sampling clock in the order of FCLK_P4, FCLK_P5, FCLK_P5, FCLK_P5, FCLK_P3, and FCLK_P4.

As has been explained above, a communication device in accordance with an exemplary aspect of the present invention includes the current information storage unit 130 that stores a bit boundary signal indicating the presence/absence of a variation point of a reception signal at each of timings at which the sampling clock is updated, and a past information storage unit 140 that retains a bit boundary signal that is detected when a variation point of the reception signal can be detected in preparation for the reception of continuous data or in a similar situation in which no variation point can be detected in the reception signal. In this way, even in a case in which continuous data is included in the serial data series of the reception signal and the situation where no variation point can be detected in the reception signal thereby continues, and then serial data other than continuous data appears, the synchronous pattern can be selected based on the bit boundary signal retained in the past information storage unit 140. Therefore, it is possible to select the optimal sampling clock capable of performing correct reception with a high probability.

Further, according to a communication device in accordance with an exemplary aspect of the present invention, bit boundary signal detection processing is started from synchronous word data located in the head of the reception frame, and the bit boundary signal based on the synchronous word data can be stored in the past information storage unit 140. Therefore, since the bit boundary detection unit 32 can generate BNDFLG[n−1:0] in which at least one of the output values is not "0" based on the synchronous word data, a bit boundary signal that is obtained when a variation point can be detected in the reception signal can be stored as the initial bit boundary signal stored in the past information storage unit 140. Therefore, even when no variation point is detected in the reception signal during the reception of the payload data subsequent to the synchronous word data, the optimal sampling clock can be selected by using BNDFLG[n−1:0] stored in the past information storage unit 140.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A communication device that receives a reception signal including a synchronous word and a payload in each frame and samples the reception signal by using one sampling clock selected from N-phase clocks (N is an integer equal to or greater than two), comprising:
   a bit boundary detection unit that detects a bit boundary signal from the received reception signal, the bit boundary signal indicating between which clocks a variation point of the reception signal is located among the N-phase clocks;
   a clock update timing control unit that controls timings at which the sampling clock is updated;
   a first bit boundary signal storage unit that stores the bit boundary signal at each of the timings;
   a second bit boundary signal storage unit that takes in and stores a signal stored in the first bit boundary signal storage unit when a variation point of the reception signal is detected in the bit boundary detection unit, and does not update a signal stored therein when no variation point of the reception signal is detected; and
   a first clock selection unit that selects the sampling clock based on a signal stored in the first bit boundary signal storage unit when a variation point of the reception signal is detected in the bit boundary detection unit, and selects the sampling clock based on a signal stored in the second bit boundary signal storage unit when no variation point of the reception signal is detected.

2. The communication device according to claim 1, wherein the clock update timing control unit defines timing at which a predetermined number of bits are received in the payload as the timing at which the sampling clock is updated.

3. The communication device according to claim 1, wherein
   a frame of the reception signal has a structure in which the synchronous word is located at a head, and
   the bit boundary detection unit detects a bit boundary signal of the synchronous word at a start of a reception of the frame and stores the detected bit boundary signal in the first bit boundary signal storage unit.

4. The communication device according to claim 1, wherein the first clock selection unit comprises:
   a first clock selection unit that selects the sampling clock based on a first bit boundary signal stored in the first bit boundary signal storage unit when a variation point of the reception signal is detected in the bit boundary detection unit; and
   a second clock selection unit that selects the sampling clock based on a second bit boundary signal stored in the second bit boundary signal storage unit when no variation point of the reception signal is detected.

5. The communication device according to claim 4, wherein
   the first clock selection unit selects one clock that is away from a variation point of a reception signal indicated by the first bit boundary signal by a predetermined phase from the N-phase clocks, and
   the second clock selection unit selects one clock that is away from a variation point of a reception signal indicated by the second bit boundary signal by a predetermined phase from the N-phase clocks.

6. The communication device according to claim 1, wherein the bit boundary detection unit detects the bit boundary signal by comparing a reception signal received by using a clock having a first phase included in the N-phase clocks with the reception signal received by using a clock having a second phase adjacent to the first phase.

7. The communication device according to claim 1, further comprising:
   a synchronous detection unit that detects synchronization by performing reception using the N-phase clocks for the synchronous word and generates a clock identification signal used to identify a synchronously-detected clock; and
   a second clock selection unit that selects the sampling clock based on the clock identification signal generated in the synchronous detection unit and the bit boundary signal detected in the bit boundary detection unit.

8. The communication device according to claim 7, wherein the second clock selection unit selects one clock, which is a synchronously-detected clock indicated by the clock identification signal and is away from a variation point of a reception signal indicated by the bit boundary signal by a predetermined phase, from the N-phase clocks as the sampling clock.

* * * * *